(12) United States Patent
Komatsu

(10) Patent No.: US 12,486,950 B2
(45) Date of Patent: Dec. 2, 2025

(54) METHOD FOR CONSTRUCTING TRIPLE-SHELL TANK

(71) Applicant: KAWASAKI JUKOGYO KABUSHIKI KAISHA, Kobe (JP)

(72) Inventor: Takanori Komatsu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 35 days.

(21) Appl. No.: 18/724,085

(22) PCT Filed: Dec. 20, 2022

(86) PCT No.: PCT/JP2022/046942
§ 371 (c)(1),
(2) Date: Jun. 25, 2024

(87) PCT Pub. No.: WO2023/127605
PCT Pub. Date: Jul. 6, 2023

(65) Prior Publication Data
US 2025/0067398 A1 Feb. 27, 2025

(30) Foreign Application Priority Data
Dec. 27, 2021 (JP) ................. 2021-212503

(51) Int. Cl.
*E04H 7/06* (2006.01)
*F17C 13/00* (2006.01)

(52) U.S. Cl.
CPC ...... *F17C 13/00* (2013.01); *F17C 2201/0119* (2013.01); *F17C 2201/052* (2013.01); *F17C 2203/0631* (2013.01); *F17C 2209/23* (2013.01)

(58) Field of Classification Search
CPC ............. F17C 13/00; F17C 2201/0119; F17C 2201/052; F17C 2203/0631;
(Continued)

(56) References Cited

U.S. PATENT DOCUMENTS

| 2014/0097189 A1* | 4/2014 | Simmons | F17C 3/022 220/560.04 |
| 2015/0197953 A1 | 7/2015 | Shiomi et al. | |
| 2016/0083957 A1* | 3/2016 | Yamada | E04H 7/06 52/745.01 |

FOREIGN PATENT DOCUMENTS

| GB | 2124743 A | * | 2/1984 | ............. F17C 3/022 |
| JP | 62132098 A | * | 6/1987 | ............. F17C 3/022 |

(Continued)

OTHER PUBLICATIONS

English translation of JP-62132098-A (Year: 1987).*

*Primary Examiner* — Jun S Yoo
(74) *Attorney, Agent, or Firm* — Oliff PLC

(57) ABSTRACT

A method for constructing a triple shell tank including an inner tank, an intermediate tank, and an outer tank each having a roof and a side plate includes the following procedure. As construction entrances, a first construction opening is opened in an outer tank side plate, a second construction opening is opened in an inner tank side plate, and a third construction opening is opened in an intermediate tank side plate, each during the installation of the corresponding side plate. The construction openings are opened so as to partially overlap with one another in a circumferential direction and a height direction of the triple shell tank. The first construction opening and the second construction opening are opened so as to satisfy a relationship $AR1 \geq AR2$, where $AR1$ is an opening area of the first construction opening and $AR2$ is an opening area of the second construction opening.

8 Claims, 19 Drawing Sheets

(58) Field of Classification Search
CPC .......... F17C 2209/23; F17C 2201/0109; F17C 2201/032; F17C 2203/0329; F17C 2203/0341; F17C 2203/0375; F17C 2203/0639; F17C 2203/0678; F17C 2209/232; F17C 2221/012; F17C 2223/0161; F17C 2223/033; F17C 2260/013; F17C 2270/0136; F17C 3/022; B65D 90/00; B65D 90/02; B65D 90/024; B65D 90/08; B65D 90/12; B65D 88/06; B65D 25/005; B65D 88/1606; B65D 88/1618; B65D 88/1656; B65D 90/028; E04H 7/04; E04H 7/06
See application file for complete search history.

(56) References Cited

FOREIGN PATENT DOCUMENTS

| | | | |
|---|---|---|---|
| JP | 5672787 | B2 | 2/2015 |
| JP | 6127453 | B2 | 5/2017 |

\* cited by examiner

H1>H3>H2
AR1>AR3>AR2

W1>W3>W2

METHOD FOR CONSTRUCTING TRIPLE-SHELL TANK

TECHNICAL FIELD

The present disclosure relates to a method for constructing a triple shell tank that stores a low temperature liquefied gas.

BACKGROUND ART

A flat-bottomed tank having a multi-shell structure is known as a facility for storing a low temperature liquefied gas. Construction of this type of multi-shell tank generally requires a long construction period because the construction structure itself is large in scale and impartment of a heat insulation structure is required. For example, Patent Literatures 1 and 2 disclose a method for constructing a tank having a double shell structure including an inner tank and an outer tank for the purpose of shortening of the construction period. In recent years, a flat-bottomed tank having a triple shell structure including an intermediate tank between an inner tank and an outer tank has been studied as a storage facility for a cryogenic liquefied gas.

In construction of the triple shell tank, it is desirable from the viewpoint of shortening the construction period not to sequentially install the inner tank, the intermediate tank, and the outer tank but to construct them in parallel. In this case, construction openings for carrying in and out construction materials and construction equipment and for allowing workers to enter and exit need to be opened on the side plate of each of the inner tank, the intermediate tank, and the outer tank. Unless these construction openings are appropriately disposed on the side plates, smooth work progress may be interrupted, and shortening of the construction period may be hindered.

CITATION LIST

Patent Literature

Patent Literature 1: Japanese Patent No. 6127453
Patent Literature 2: Japanese Patent No. 5672787

SUMMARY OF INVENTION

An object of the present disclosure is to provide a construction method that can optimize an opening aspect of a construction opening and contribute to shortening of a construction period in constructing a triple shell tank including an inner tank, an intermediate tank, and an outer tank.

A method for constructing a triple shell tank according to an aspect of the present disclosure is a method for constructing a triple shell tank including an inner tank, an intermediate tank, and an outer tank each having a roof and a side plate, the method including processes of: as construction entrances, opening a first construction opening in the outer tank side plate when installing the outer tank side plate, a second construction opening in the inner tank side plate when installing the inner tank side plate, and a third construction opening in the intermediate tank side plate when installing the intermediate tank side plate; and sealing the second construction opening after completion of work inside the inner tank, then sealing the third construction opening after completion of work inside the intermediate tank, and subsequently, sealing the first construction opening after completion of work inside the outer tank, in which the first construction opening, the second construction opening, and the third construction opening are opened so as to at least partially overlap with one another in a circumferential direction and a height direction of the triple shell tank, and the first construction opening and the second construction opening are opened so as to satisfy a relationship of $$AR1 \geq AR2$$

where $AR1$ is an opening area of the first construction opening and $AR2$ is an opening area of the second construction opening.

According to the present disclosure, it is possible to provide a construction method that can optimize an opening aspect of a construction opening and contribute to shortening of a construction period in constructing a triple shell tank including an inner tank, an intermediate tank, and an outer tank.

DESCRIPTION OF EMBODIMENTS

Hereinafter, embodiments of the method for constructing the triple shell tank according to the present disclosure will be described in detail with reference to the drawings. The triple shell tank that is a construction target of the present disclosure is a tank that stores a low temperature liquefied gas, and is a flat-bottomed tank having a ground installation triple shell structure. The liquefied gas to be stored is, for example, liquefied hydrogen or liquid helium.

[Structure of Triple Containment Tank]

Figure 1:
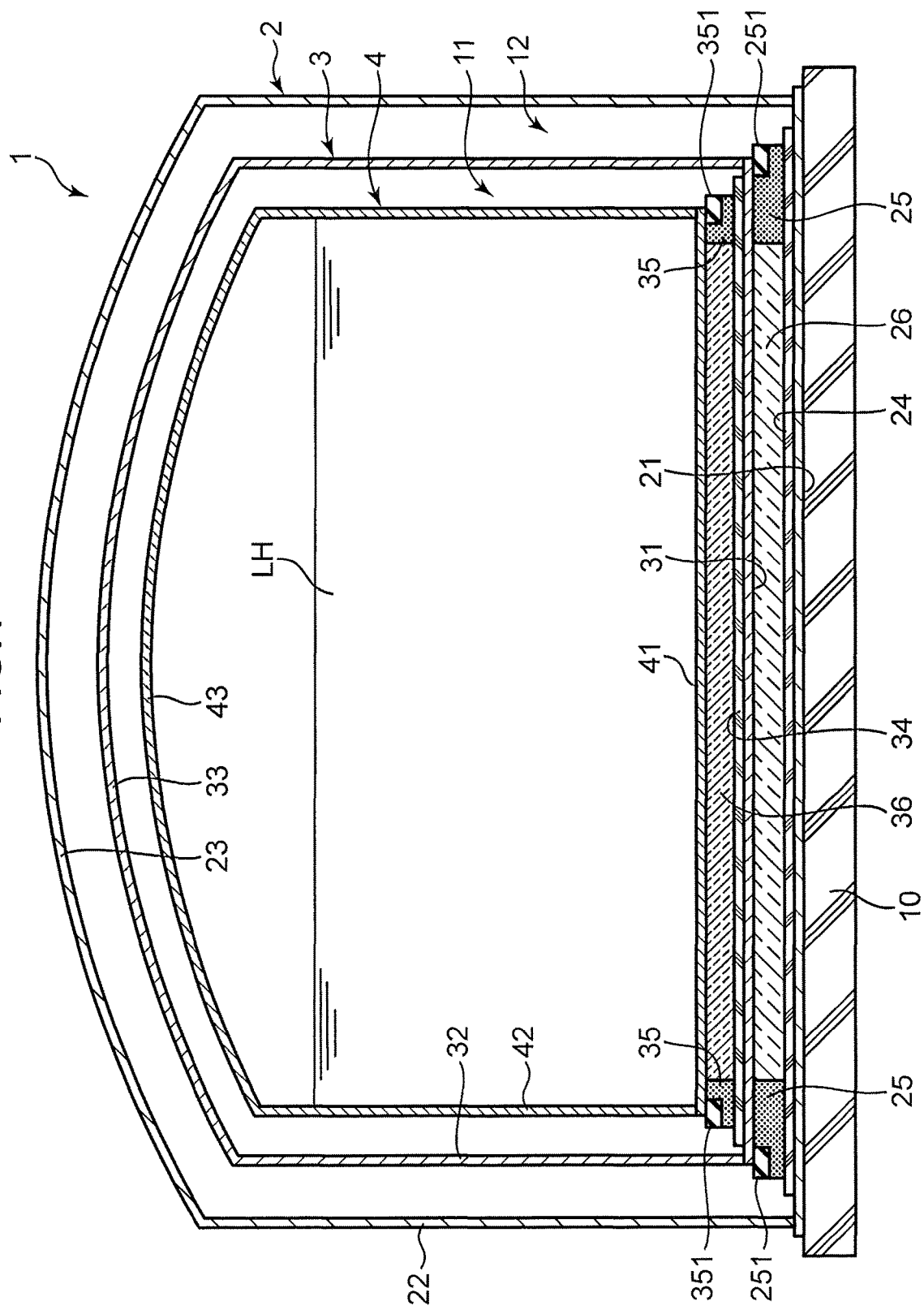
FIG. 1 is a longitudinal cross-sectional view illustrating a structure of a triple shell tank that becomes a construction target according to the present disclosure.

First, the structure of a triple shell tank 1 that becomes a construction target according to the present disclosure will be described with reference to the longitudinal cross-sectional view illustrated in FIG. 1. FIG. 1 illustrates a triple shell tank 1 that stores liquid hydrogen LH. The triple shell tank 1 includes a tank base 10, an outer tank 2 erected on the tank base 10, an intermediate tank 3 contained in the outer tank 2, and an inner tank 4 contained in the intermediate tank 3. The outer tank 2, the intermediate tank 3, and the inner tank 4 each have a circular shape in top view, and are disposed concentrically.

The tank base 10 is a concrete layer constituting a base portion of the triple shell tank 1. The tank base 10 has a size larger than an outer diameter of the outer tank 2. The outer tank 2 is a sealed body made of metal such as carbon steel, and includes an outer tank bottom plate 21, an outer tank side plate 22, and an outer tank roof 23. The outer tank bottom plate 21 is laid immediately above the tank base 10, and has a disk shape. The outer tank side plate 22 is erected from a peripheral edge of the outer tank bottom plate 21 and has a cylindrical shape. The outer tank roof 23 is attached to the upper end of the outer tank side plate 22 so as to close an upper surface opening of the outer tank side plate 22 having a cylindrical shape, and has a dome shape.

The intermediate tank 3 is a sealed body made of metal such as SUS, and is disposed inside the outer tank 2. The intermediate tank 3 includes an intermediate tank bottom plate 31, an intermediate tank side plate 32, and an intermediate tank roof 33. The intermediate tank bottom plate 31 has a disk shape having a diameter smaller than that of the outer tank bottom plate 21. The intermediate tank side plate 32 is erected from a peripheral edge of the intermediate tank bottom plate 31 and has a cylindrical shape. The intermediate tank roof 33 is attached to the upper end of the intermediate tank side plate 32 and has a dome shape.

A first level concrete layer 24, a first ring portion 25, and an outer bottom portion cool layer 26 are interposed between the outer tank bottom plate 21 and the intermediate tank bottom plate 31. The first level concrete layer 24 is a flattened concrete layer constructed on the outer tank bottom plate 21. The first ring portion 25 is a high-strength concrete layer arranged in a ring shape on the vicinity of the peripheral edge of the first level concrete layer 24. A reinforced concrete layer 251 is disposed at a part of the first ring portion 25 that directly receives a load of the intermediate tank side plate 32. The outer bottom portion cool layer 26 is a layer having a heat insulating property disposed on the first level concrete layer 24 and inside the first ring portion 25. The first ring portion 25 can be formed of an array body of insulating concrete blocks such as perlite concrete blocks. The outer bottom portion cool layer 26 can be formed of an array body of insulating inorganic block materials such as foam glass. For example, a plate material of lightweight aerated concrete may be laid on the outer bottom portion cool layer 26.

The inner tank 4 is a tank that actually stores liquid, is a sealed body made of metal such as SUS, and is disposed inside the intermediate tank 3. The inner tank 4 includes an inner tank bottom plate 41, an inner tank side plate 42, and an inner tank roof 43. The inner tank bottom plate 41 has a disk shape having a diameter smaller than that of the intermediate tank bottom plate 31. The inner tank side plate 42 is erected from a peripheral edge of the inner tank bottom plate 41 and has a cylindrical shape. The inner tank roof 43 is attached to the upper end of the inner tank side plate 42 and has a dome shape. The liquid hydrogen LH is stored inside the inner tank 4.

A second level concrete layer 34, a second ring portion 35, and an inner bottom portion cool layer 36 are interposed between the intermediate tank bottom plate 31 and the inner tank bottom plate 41. The second level concrete layer 34 is constructed on the intermediate tank bottom plate 31. The second ring portion 35 is a high-strength concrete layer arranged in a ring shape on the vicinity of the peripheral edge of the second level concrete layer 34. A reinforced concrete layer 351 is disposed at a part of the second ring portion 35 that directly receives a load of the inner tank side plate 42. The inner bottom portion cool layer 36 is a layer having a heat insulating property disposed on the second level concrete layer 34 and inside the second ring portion 35. For example, the second ring portion 35 can be formed of a perlite concrete block, and the inner bottom portion cool layer 36 can be formed of a foam glass block or the like. For example, a plate material of lightweight aerated concrete may be laid on the inner bottom portion cool layer 36.

A gap having a predetermined width is provided between the inner tank 4 and the intermediate tank 3 and between the intermediate tank 3 and the outer tank 2. A first inter-tank 11, which is a gap between the inner tank 4 and the intermediate tank 3, and a second inter-tank 12, which is a gap between the intermediate tank 3 and the outer tank 2, are filled with a heat insulation material. As the heat insulation material, perlite or glass wool can be used. The first inter-tank 11 is filled with a low-boiling gas equivalent to the liquid hydrogen LH stored in the inner tank 4, for example, hydrogen gas. The second inter-tank 12 is filled with nitrogen gas, for example.

[Regarding Opening of Construction Opening]

In construction of the triple shell tank 1, the construction period is prolonged if a method of sequentially installing from an inner tank is adopted, such as starting installation of the intermediate tank 3 after completion of the inner tank 4 and installing the outer tank 2 after completion of the intermediate tank 3. On the other hand, if the outer tank 2, the intermediate tank 3, and the inner tank 4 are installed in parallel, work efficiency can be improved such that the scaffold and the crane can be shared in installation of a plurality of tanks, and as a result, it is possible to contribute to shortening of the construction period. In this case, construction openings for carrying in and out construction materials and construction equipment and for allowing workers to enter and exit need to be opened in the outer tank side plate 22, the intermediate tank side plate 32, and the inner tank side plate 42.

First Embodiment

Figure 2A:
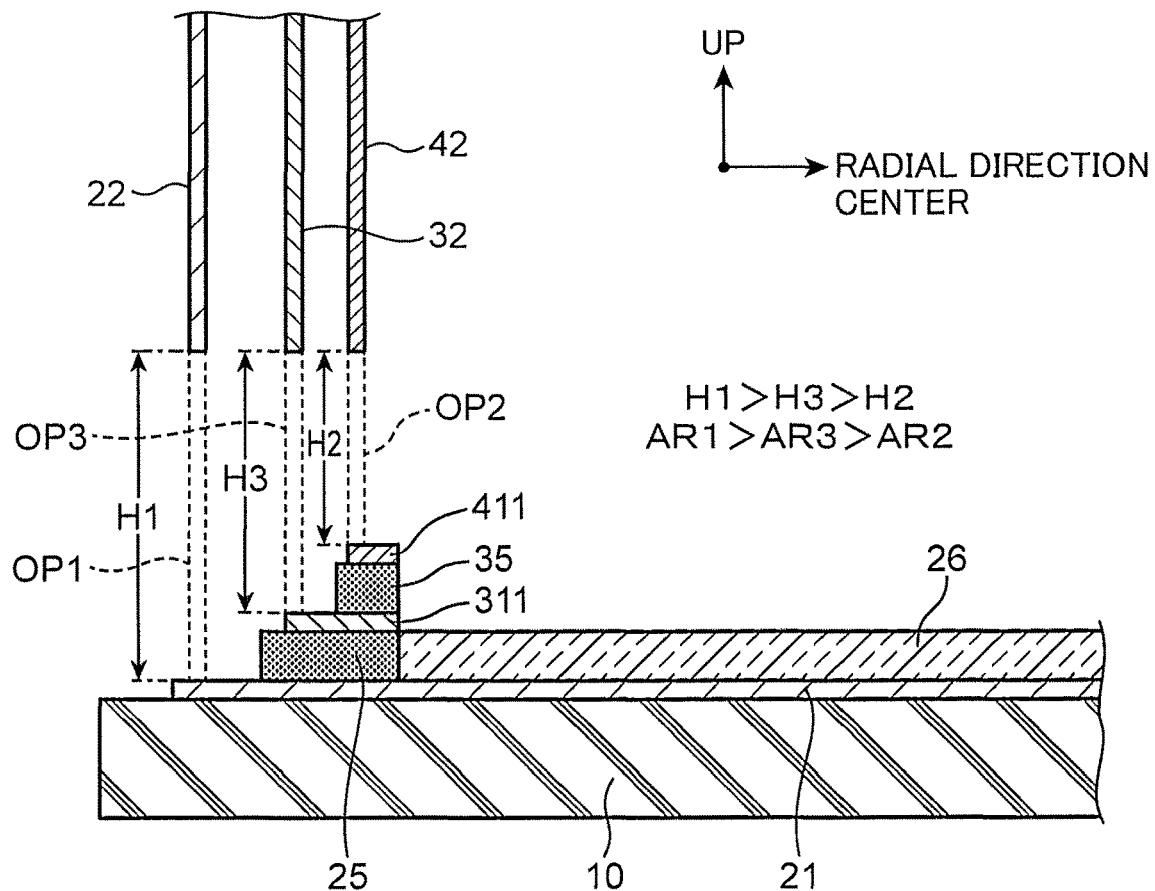
FIG. 2A is a view illustrating a first embodiment of opening of a construction opening, and is a longitudinal cross-sectional view of a location of opening of the construction opening.
Figure 2B:
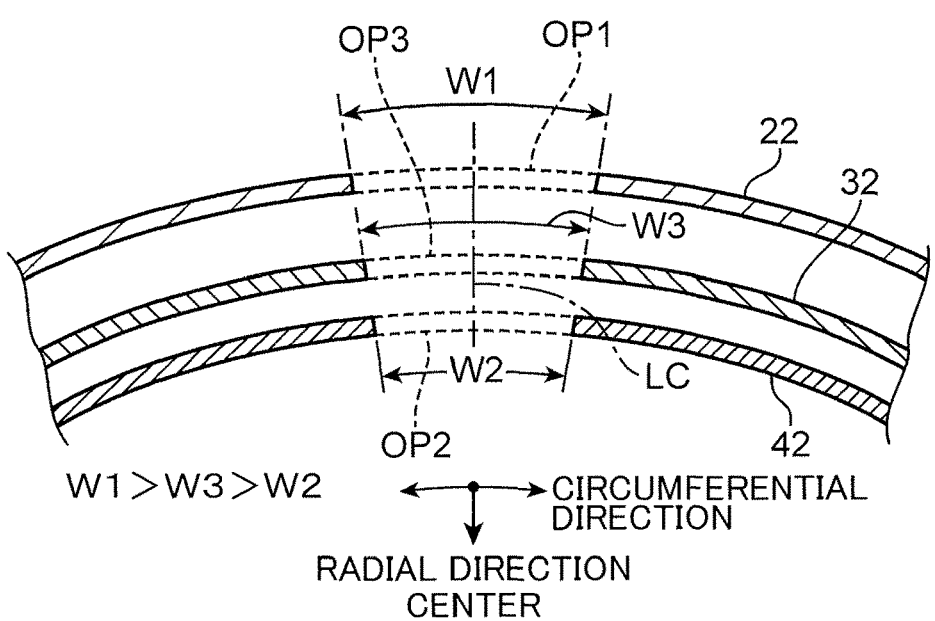
FIG. 2B is a horizontal cross-sectional view of the location of opening of the construction opening illustrated in FIG. 2A.

FIGS. 2A and 2B are views illustrating the first embodiment of opening of the construction opening, in which FIG. 2A is a longitudinal cross-sectional view of the location of opening of the construction opening, and FIG. 2B is a horizontal cross-sectional view. In construction of the triple shell tank 1, as construction entrances, a first opening OP1 (first construction opening) is opened when the outer tank side plate 22 is installed, a second opening OP2 (second construction opening) is opened when the inner tank side plate 42 installed, and a third opening OP3 (third construction opening) is opened when the intermediate tank side plate 32 is installed. Since these openings OP1, OP2, and OP3 are temporarily opened for construction, they are sealed after being used in order from the inside. That is, the second opening OP2 is sealed after completion of the work inside the inner tank 4, and then the third opening OP3 is sealed after completion of the work inside the intermediate tank 3, and thereafter, the first opening OP1 is sealed after completion of the work inside the outer tank 2. The construction of the triple shell tank 1 includes processes of opening and sealing of the construction opening as described above.

An opening aspect of these construction openings will be described. A work traffic line penetrating the three side plates 22, 32, and 42 of the triple shell tank 1 and directed radially inward or outward is desirably linear in consideration of entry and exit of workers and ease of carrying in of materials. Therefore, the first opening OP1, the second opening OP2, and the third opening OP3 are opened so as to at least partially overlap with one another in the circumferential direction and the height direction of the triple shell tank 1 in order to ensure the linearity of the work traffic line. That is, the first opening OP1, the second opening OP2, and the third opening OP3 are opened so as to at least partially overlap with one another on a straight line LC extending in the radial direction as viewed from the radial center of the triple shell tank 1 having a cylindrical shape.

The first opening OP1 is opened at a predetermined opening height H1 and a circumferential opening width W1 in the lowermost region of the outer tank side plate 22. The outer tank side plate 22 is erected in the vicinity of the outer peripheral edge of the outer tank bottom plate 21. The first opening OP1 is a rectangular opening having the upper surface of the outer tank bottom plate 21 as a lower end edge and having an upper end edge at a position upper by the opening height H1.

The second opening OP2 is opened at a predetermined opening height H2 and a circumferential opening width W2 in the lowermost region of the inner tank side plate 42. The inner tank side plate 42 is erected on an inner tank annular 411. The second opening OP2 is a rectangular opening having the upper surface of the inner tank annular 411 as a lower end edge and having an upper end edge at a position upper by the opening height H2. Similarly, the third opening OP3 is opened at a predetermined opening height H3 and a circumferential opening width W3 in the lowermost region of the intermediate tank side plate 32. The intermediate tank side plate 32 is erected on an intermediate tank annular 311. The third opening OP3 is a rectangular opening having the upper surface of the intermediate tank annular 311 as a lower end edge and having an upper end edge at a position upper by the opening height H3.

The triple shell tank 1 has a shell structure in which the intermediate tank 3 is provided so as to cover the entire inner tank 4, and the outer tank 2 is provided so as to cover the entire intermediate tank 3. Therefore, the lowermost position of the side plate becomes the lowest in the outer tank side plate 22, the second highest in the intermediate tank side plate 32, and the highest in the inner tank side plate, and a step in the height direction occurs. On the other hand, in consideration of workability, the construction opening of each side plate is required to be opened in the vicinity of the lowermost region of the respective side plates 22, 32, and 42 closest to the ground as illustrated in FIG. 2A. However, in a case of responding to this requirement, due to the step described above, a step in the height direction is generated between the lower end edge of the first opening OP1 and the lower end edge of the second opening OP2, between the lower end edge of the first opening OP1 and the lower end edge of the third opening OP3, and between the lower end edge of the third opening OP3 and the lower end edge of the second opening OP2. Such a step of the construction opening becomes an obstacle to securing of a smooth work traffic line, and may interfere with the work.

In view of this point, as illustrated in FIG. 2A, the relationship among the opening heights H1, H2, and H3 of the first opening OP1, the second opening OP2, and the third opening OP3 is set so as to satisfy the following Formula (1).

$$H1 > H3 > H2 \qquad (1)$$

More specifically, while the height positions of the upper end edges of the openings OP1, OP2, and OP3 are substantially identical, the lower end edges are set at the lowermost positions of the side plates 22, 32, and 42. As a result, the openings OP1, OP2, and OP3 satisfying the relationship of Formula (1) are opened.

As illustrated in FIG. 2B, in the circumferential direction of the triple shell tank 1, the first opening OP1, the second opening OP2, and the third opening OP3 are arranged side by side on the straight line LC directed toward the radial center of the triple shell tank 1. The circumferential centers of the openings OP1, OP2, and OP3 are desirably arranged side by side on the straight line LC. The openings OP1, OP2, and OP3 are set such that the relationship among the circumferential opening widths W1, W2, and W3 thereof satisfies the following Formula (2).

$$W1 > W3 > W2 \qquad (2)$$

The opening areas AR1, AR2, and AR3 of the respective openings OP1, OP2, and OP3 can be obtained by multiplication of the opening height and the opening width when the curvatures of the side plates 22, 32, and 42 are ignored. From the relationships of Formulas (1) and (2), the opening areas AR1, AR2, and AR3 satisfy the following Formula (3).

$$AR1 > AR3 > AR2 \qquad (3)$$

According to the first embodiment, the first opening OP1, the second opening OP2, and the third opening OP3 have common opening widths arranged in the horizontal direction in the range of the width of the opening height H2 of the innermost second opening OP2 in the height direction of the triple shell tank 1. Also in the circumferential direction of the triple shell tank 1, the three openings OP1, OP2, and OP3 have opening widths overlapping one another on the straight line LC toward the radial center. As a result, the openings OP1, OP2, and OP3 have opening areas AR1, AR2, and AR3 that satisfy Formula (3). Therefore, even if a step exists at the lowermost position of the three side plates 22, 32, and 42, it is possible to secure a horizontal and linear work traffic line penetrating these side plates and directed radially inward or outward. Accordingly, it is possible to facilitate entry and exit of workers and carrying in of materials through the openings OP1, OP2, and OP3.

Second Embodiment

Figure 3A:
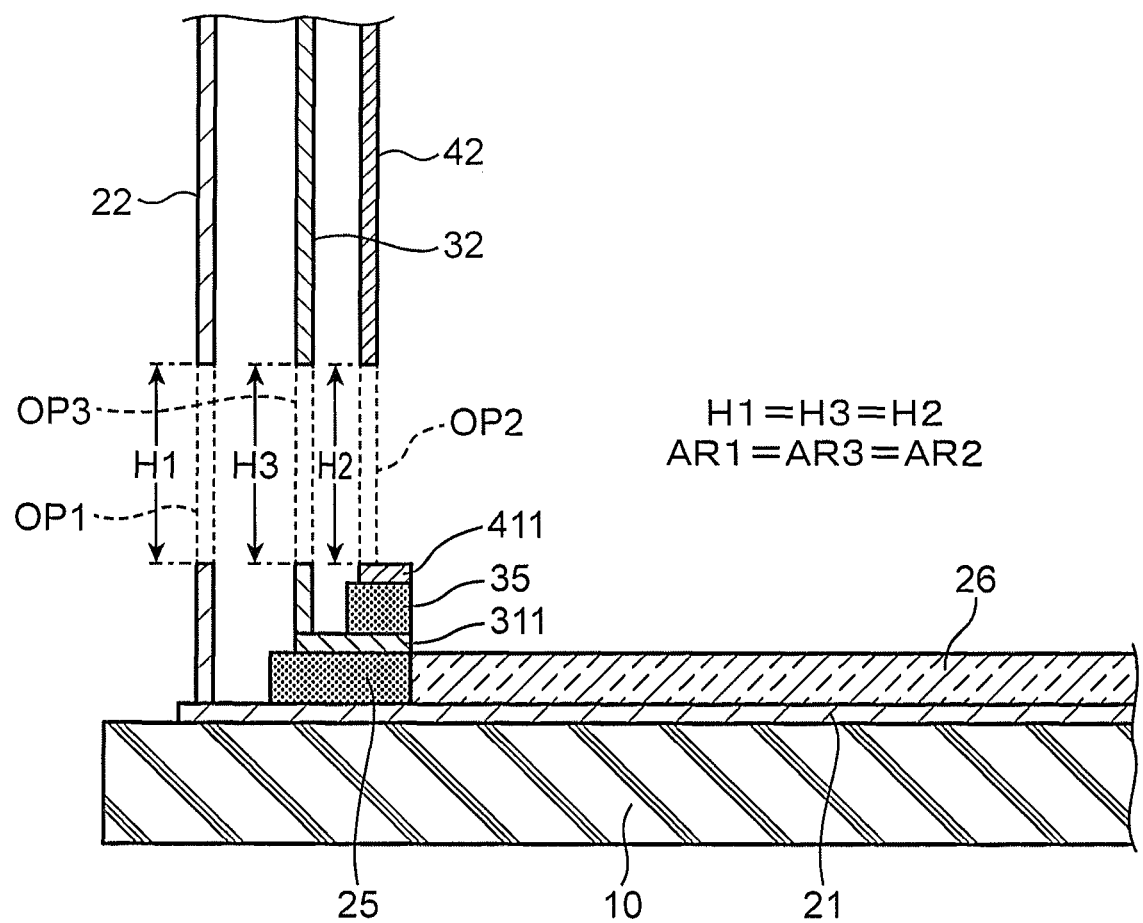
FIG. 3A is a view illustrating a second embodiment of opening of a construction opening, and is a longitudinal cross-sectional view of a location of opening of the construction opening.
Figure 3B:
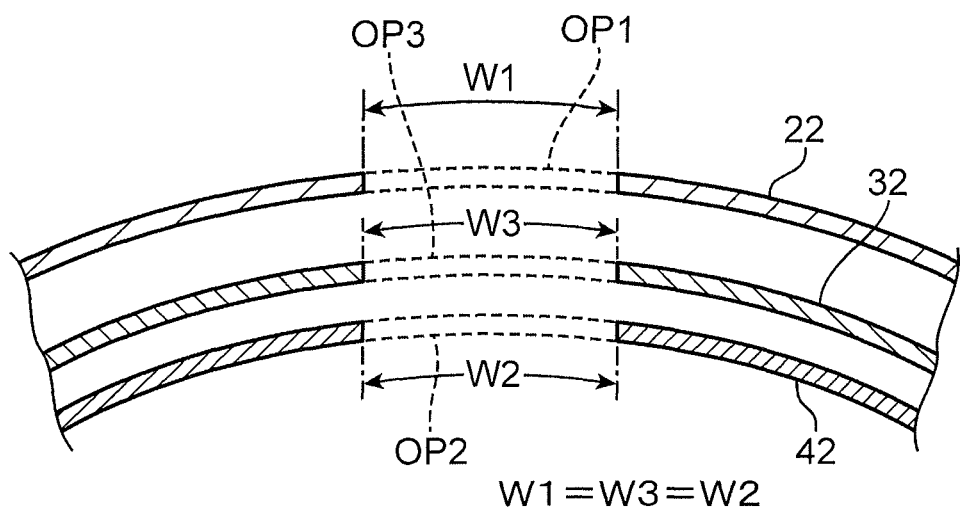
FIG. 3B is a horizontal cross-sectional view of the location of opening of the construction opening illustrated in FIG. 3A.

FIGS. 3A and 3B are views illustrating the second embodiment of opening of the construction opening, in which FIG. 3A is a longitudinal cross-sectional view of the location of opening of the construction opening, and FIG. 3B is a horizontal cross-sectional view. The second embodiment describes an example in which the opening heights H1, H2, and H3 of the first opening OP1, the second opening OP2, and the third opening OP3, and the circumferential opening widths W1, W2, and W3 are identical. That is, the opening heights H1, H2, and H3 and the circumferential opening widths W1, W2, and W3 are set so as to satisfy the following Formulas (11) and (21). As a result, the opening areas AR1, AR2, and AR3 satisfy the relationship of the following Formula (31).

$$H1 = H3 = H2 \quad (11)$$

$$W1 = W3 = W2 \quad (21)$$

$$AR1 = AR3 = AR2 \quad (31)$$

As illustrated in FIG. 3A, the height positions of the upper end edges and the lower end edges of the three openings OP1, OP2, and OP3 are present at substantially the same position. That is, the three openings OP1, OP2, and OP3 are opened in the respective side plates 22, 32, and 42 at the same height position. As illustrated in FIG. 3B, the three openings OP1, OP2, and OP3 are opened in the respective side plates 22, 32, and 42 at the same position in the circumferential direction of the triple shell tank 1. Also according to the opening aspect of the construction opening of the second embodiment, it is possible to secure a horizontal and linear work traffic line penetrating the three side plates 22, 32, and 42 and directed radially inward or outward.

The opening heights H1, H2, and H3, the opening widths W1, W2, and W3, and the opening areas AR1, AR2, and AR3 of the first opening OP1, the second opening OP2, and the third opening OP3 can be appropriately set within a range not greatly deviating from the ranges of Formulas (1) to (11), (2) to (21), and (3) to (31).

For example, focusing on the first opening OP1 and the second opening OP2, the opening heights H1 and H2, the opening widths W1 and W2, and the opening areas AR1 and AR2 can be set as follows.

$$H1 > H2 \text{ or } H1 \geq H2 \quad (41)$$

$$W1 > W2 \text{ or } W1 \geq W2 \quad (42)$$

$$AR1 > AR2 \text{ or } AR1 \geq AR2 \quad (43)$$

By satisfying Formulas (41) to (43), even if a step exists in the height direction between the lowermost position of the outer tank side plate 22 and the lowermost position of the inner tank side plate 42, it becomes easy to eliminate the step and form a construction opening that can secure a work traffic line extending horizontally and linearly in the radial direction. In this case, the third opening OP3 may be set to an opening having the opening height H3, the opening width W3, and the opening area AR3 of appropriate sizes not obstructing the work traffic line.

The second opening OP2 and the third opening OP3 may be set to have an identical opening height, an identical circumferential opening width, and an identical opening area. That is, three openings OP1, OP2, and OP3 may be opened so as to satisfy the following Formulas (12), (22), and (32).

$$H1 > H3 = H2 \quad (12)$$

$$W1 > W3 = W2 \quad (22)$$

$$AR1 > AR3 = AR2 \quad (32)$$

In summary, the opening heights H1, H2, and H3, the opening widths W1, W2, and W3, and the opening areas AR1, AR2, and AR3 of the first opening OP1, the second opening OP2, and the third opening OP3 may be opened within a range satisfying the following Formulas (13), (23), and (33).

$$H1 \geq H3 \geq H2 \quad (13)$$

$$W1 \geq W3 \geq W2 \quad (23)$$

$$AR1 \geq AR3 \geq AR2 \quad (33)$$

Third Embodiment

Figure 4A:
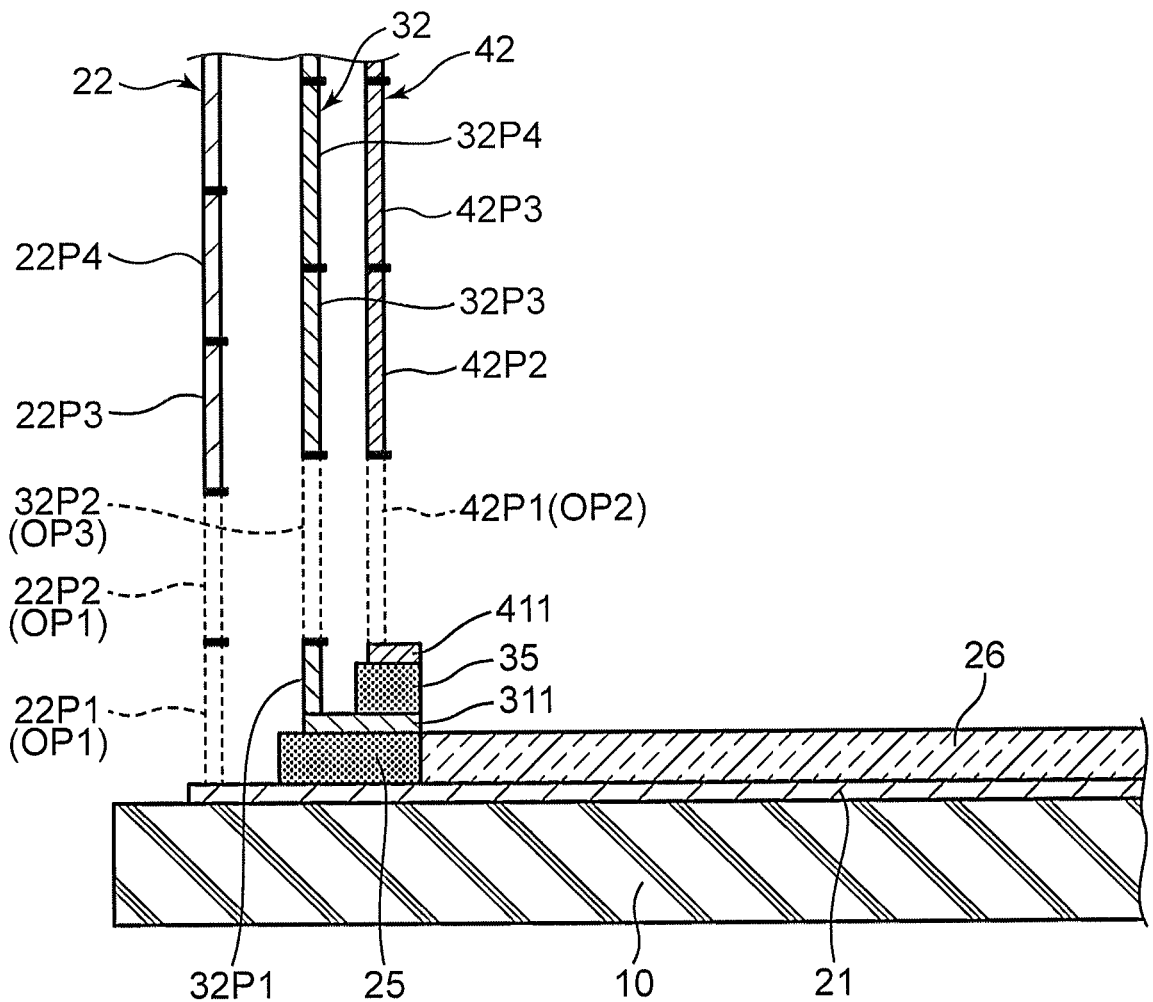
FIG. 4A is a view illustrating a third embodiment of opening of a construction opening, and is a longitudinal cross-sectional view of a location of opening of the construction opening.
Figure 4B:
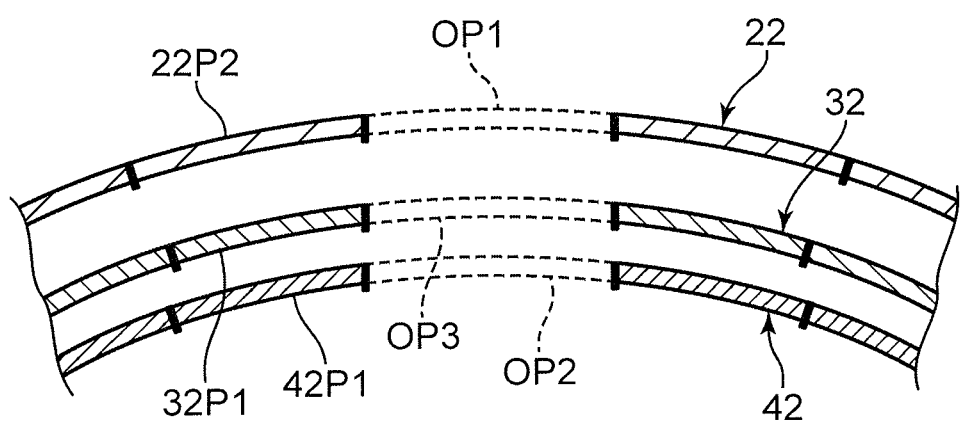
FIG. 4B is a horizontal cross-sectional view of the location of opening of the construction opening illustrated in FIG. 4A.
Figure 5:
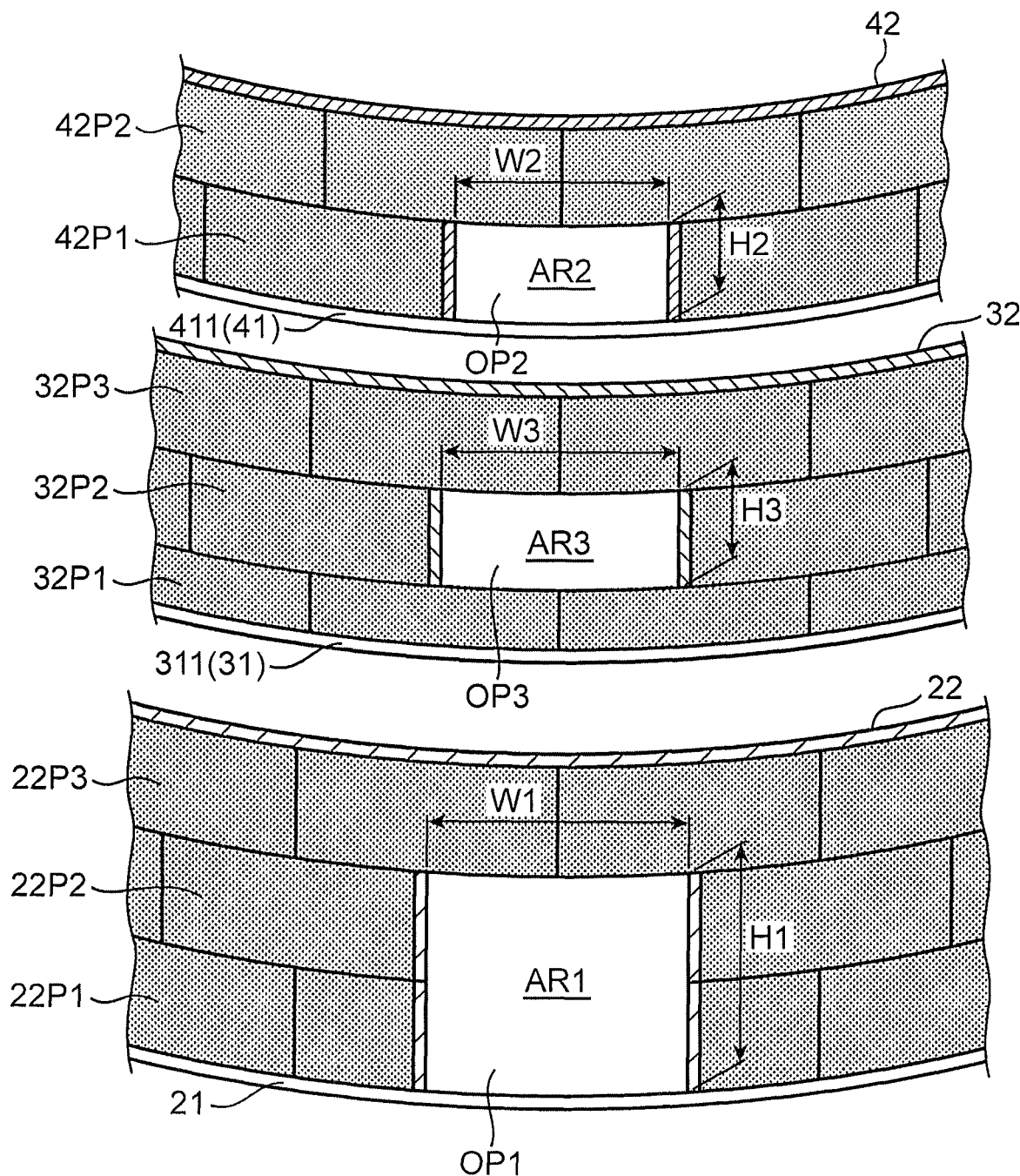
FIG. 5 is an exploded view illustrating an opening aspect of the construction opening of the third embodiment for each of the inner tank side plate, the intermediate tank side plate, and the outer tank side plate.

Next, an example of opening a construction opening by removal of a side plate piece will be described as the third embodiment. FIGS. 4A and 4B are views illustrating the third embodiment of opening of the construction opening, in which FIG. 4A is a longitudinal cross-sectional view of the location of opening of the construction opening, and FIG. 4B is a horizontal cross-sectional view. FIG. 5 is an exploded view illustrating an opening aspect of the construction opening of the third embodiment for each of the inner tank side plate 42, the intermediate tank side plate 32, and the outer tank side plate 22.

The outer tank side plate 22, the inner tank side plate 42, and the intermediate tank side plate 32 of the triple shell tank 1 illustrated in FIG. 1 are generally assembled by stacking a plurality of circular steps formed by arranging a plurality of side plate pieces in a circular ring shape. FIGS. 4A, 4B, and 5 illustrate examples of stacking of the circular steps. The outer tank side plate 22 is assembled by using a plurality of outer tank side plate pieces 22P formed of a rectangular plate gently curved in an arc shape. Specifically, the plurality of outer tank side plate pieces 22P are arranged in a circular ring shape, and adjacent side plate pieces 22P are welded to form one circular step. By stacking a plurality of such circular steps, the outer tank side plate 22 is installed.

An outer tank side plate piece 22P1 illustrated in FIGS. 4A, 4B, and 5 is a side plate piece erected immediately above the outer tank bottom plate 21 and constituting the lowermost circular step of the outer tank side plate 22. An outer tank side plate piece 22P2 is a side plate piece constituting the second circular step stacked on the lowermost step. Thereafter, the third, fourth, . . . circular steps of the outer tank side plate 22 are stacked by outer tank side plate pieces 22P3, 22P4, . . . . As the outer tank side plate pieces 22P1 to P4, those having identical or approximate size are used. Note that since the fluid pressure decreases upward of the side plate, as the outer tank side plate piece 22P of an upper step, a piece thinner and larger in size than that in a lower step may be used. As the side plate piece for height matching and the side plate piece for backfilling of equal division, those having a size different from the regular size may be used.

The inner tank side plate 42 and the intermediate tank side plate 32 are also assembled by stacking a plurality of circular steps formed by arranging a plurality of side plate pieces in a circular ring shape. In the inner tank side plate 42, inner tank side plate pieces 42P1 are arranged in a circular ring shape on the inner tank annular 411 to form the lowermost circular step. This lowermost circular step is positioned at substantially the same height position as the height position of the second circular step of the outer tank side plate 22. Thereafter, the second, third, . . . circular steps of the inner tank side plate 42 formed by inner tank side plate pieces 42P2, 42P3, . . . are stacked.

In the intermediate tank side plate 32, intermediate tank side plate pieces 32P1 are arranged in a circular ring shape on the intermediate tank annular 311 to form the lowermost circular step. This lowermost circular step is also a side plate piece that matches the height of the second circular step of the intermediate tank side plate 32 installed by the intermediate tank side plate piece 32P2 with the height of the lowermost circular step of the inner tank side plate 42 described above. The second, third, . . . circular steps of the intermediate tank side plate 32 formed by the intermediate tank side plate pieces 32P2, 32P3, . . . are stacked on the lowermost circular step. The second circular step (side plate piece 32P2) of the intermediate tank side plate 32 is positioned at the same height position as the lowermost circular step (side plate piece 42P1) of the inner tank side plate 42, and is positioned at substantially the same height position as the second circular step (side plate piece 22P2) of the outer tank side plate 22.

In the present embodiment, the side plate pieces 22P, 32P, and 42P used for installation of the respective side plates 22, 32, and 42 have rectangular shapes having identical or approximate heights and circumferential width sizes. The sizes of these side plate pieces 22P, 32P, and 42P can be selected in accordance with the size of one piece that can be manufactured. For example, the intermediate tank side plate piece 32P and the inner tank side plate piece 42P made of SUS have the same size, and the outer tank side plate piece 22P made of carbon steel can be set to have a size slightly smaller or larger than the sizes of the side plate pieces 32P and 42P. Of course, the three side plate pieces 22P, 32P, and 42P may have an identical size, or the side plate pieces 32P and 42P may have different sizes.

The first opening OP1, the second opening OP2, and the third opening OP3 are opened by pulling out one or a plurality of the plurality of side plate pieces 22P, 32P, and 42P constituting the circular steps of the respective side plates 22, 32, and 42. In FIGS. 4A, 4B, and 5, the first opening OP1 is opened by pulling out one by one the outer tank side plate pieces 22P1 and 22P2 in the lowermost and second circular steps of the circular steps constituting the outer tank side plate 22. The second opening OP2 is opened by pulling out one inner tank side plate piece 42P1 in the lowermost circular step of the circular steps constituting the inner tank side plate 42. The third opening OP3 is opened by pulling out one intermediate tank side plate piece 32P in the second circular step on the lowermost circular step for height matching of the circular steps constituting the intermediate tank side plate 32.

As a result, the opening heights H1, H2, and H3, the opening widths W1, W2, and W3, and the opening areas AR1, AR2, and AR3 of the first opening OP1, the second opening OP2, and the third opening OP3 have the following relationships.

$$H1 > H3 = H2 \qquad (14)$$

$$W1 = W3 = W2 \qquad (24)$$

$$AR1 \geq AR3 = AR2 \qquad (34)$$

Note that the opening width W1 may be slightly different from W2 and W3. Even in this case, since the first opening OP1 is opened by removal of the side plate pieces 22P1 and 22P2 straddling two circular steps of the outer tank side plate 22, there is no variation in the relationship of Formula (34).

According to the third embodiment, the first opening OP1, the second opening OP2, and the third opening OP3 can be opened by a simple method of removal of the side plate pieces 22P1, 22P2, 32P2, and 42P1. Also in the sealing work of these openings OP1, OP2, and OP3, there is an advantage of only requiring a simple method of fitting the side plate pieces 22P1, 22P2, 32P2, and 42P1 previously removed into the respective openings and fixing them by welding or the like. The first opening OP1 is opened by pulling out the side plate pieces 22P1 and 22P2 for two steps from the lowermost step of the outer tank side plate 22, the second opening OP2 is opened by pulling out the side plate piece 42P1 of the lowermost step of the inner tank side plate 42, and the third opening OP3 is opened by pulling out the side plate piece 32P2 of the second step on the circular step for height matching. Accordingly, a construction opening corresponding to the step at the lowermost position of the three side plates 22, 32, and 42 can be opened in the respective side plates, and a work traffic line extending horizontally and linearly in the radial direction can be easily secured.

FIGS. 4A, 4B, and 5 illustrate an example in which the first opening OP1 is opened by pulling out the side plate pieces for two steps of the outer tank side plate 22, but the first opening OP1 may be opened by pulling out the side plate pieces for three or more steps. On the other hand, the second opening OP2 and the third opening OP3 can be opened by pulling out side plate pieces for steps smaller by one step than the number of removal steps of the outer tank side plate 22. That is, the first opening OP1 is opened by pulling out the side plate pieces 22P for a plurality of adjacent N steps of the circular steps constituting the outer tank side plate 22. On the other hand, the second opening OP2 and the third opening OP3 are opened by pulling out the side plate pieces 42P and 32P for (N−1) steps of the circular steps constituting the inner tank side plate 42 and the intermediate tank side plate 32, respectively. This enables the first opening OP1 having an opening area larger than that of the second opening OP2 and the third opening OP3 to be easily opened by adjustment of the number of steps of the side plate pieces to be removed.

Figure 6:
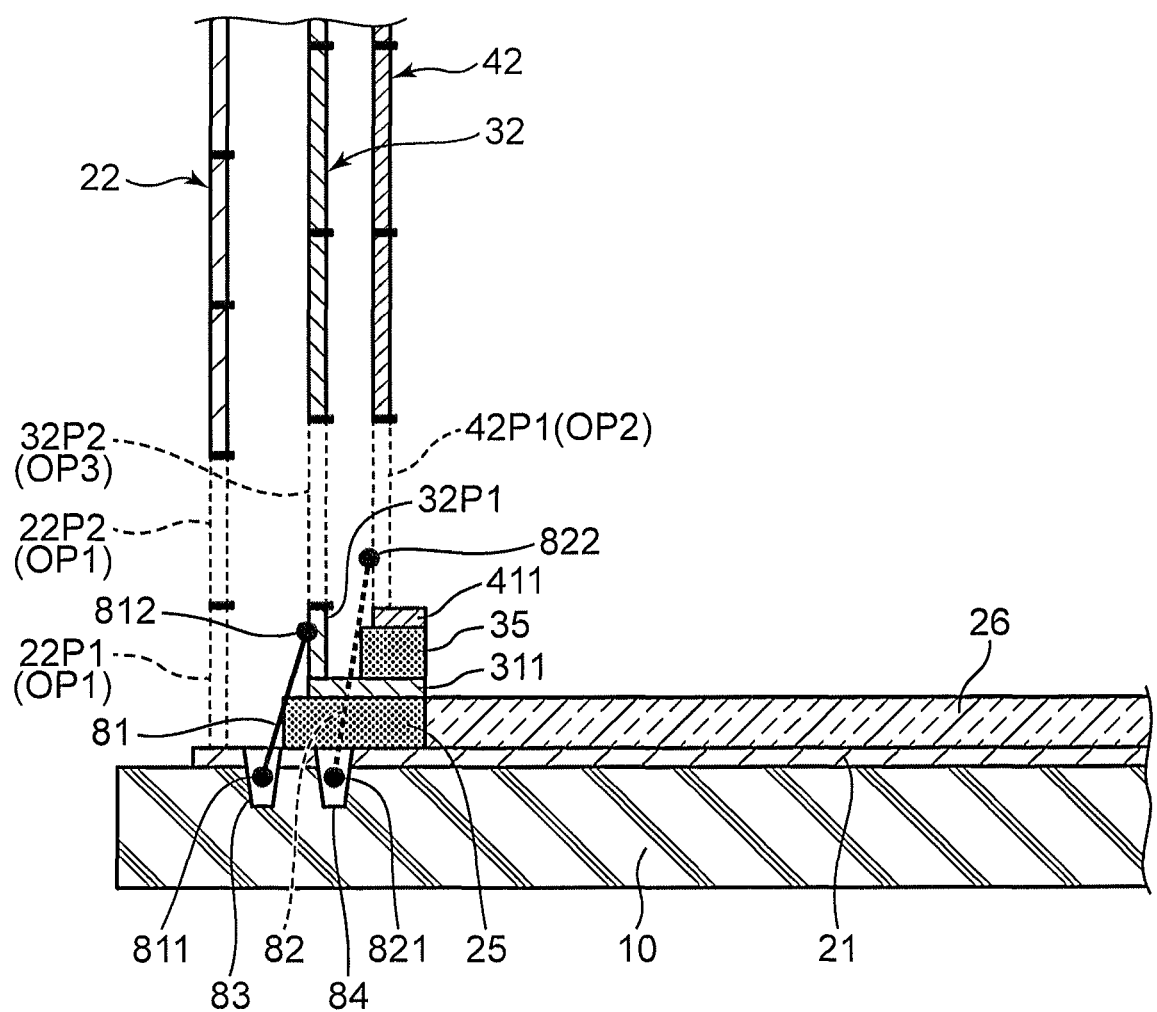
FIG. 6 is a cross-sectional view illustrating a modification of the third embodiment.

FIG. 6 is a cross-sectional view illustrating a modification of the third embodiment. The difference from the example illustrated in FIG. 4A is that an intermediate tank anchor strap 81 and an inner tank anchor strap 82 extending from the tank base 10 are connected to the intermediate tank side plate 32 and the inner tank side plate 42, respectively. This makes it possible to improve the strength and the earthquake resistance of the intermediate tank side plate 32 and the inner tank side plate 42. A lower end 811 of the intermediate tank anchor strap 81 is fixed to a first anchor box 83 embedded in the tank base 10. On the other hand, an upper end 812 of the intermediate tank anchor strap 81 is connected to the intermediate tank side plate piece 32P1 constituting the lowermost circular step of the intermediate tank side plate 32.

Since the intermediate tank anchor strap 81 is connected, there is a case where it is difficult to remove the lowermost intermediate tank side plate piece 32P1 for opening of the third opening OP3. However, since the third opening OP3 is opened by removal of the second intermediate tank side plate piece 32P2, removal of the lowermost intermediate tank side plate piece 32P1 can be made unnecessary.

A lower end 821 of the inner tank anchor strap 82 is fixed to a second anchor box 84 embedded in the tank base 10. On the other hand, an upper end 822 of the inner tank anchor strap 82 is connected to the inner tank side plate piece 42P1 constituting the lowermost circular step of the inner tank side plate 42. The inner tank side plate piece 42P1 to which the inner tank anchor strap 82 is connected is a piece other than the inner tank side plate piece 42P1 to be removed for opening of the second opening OP2.

[Method for Constructing Triple Containment Tank]

Figure 7:
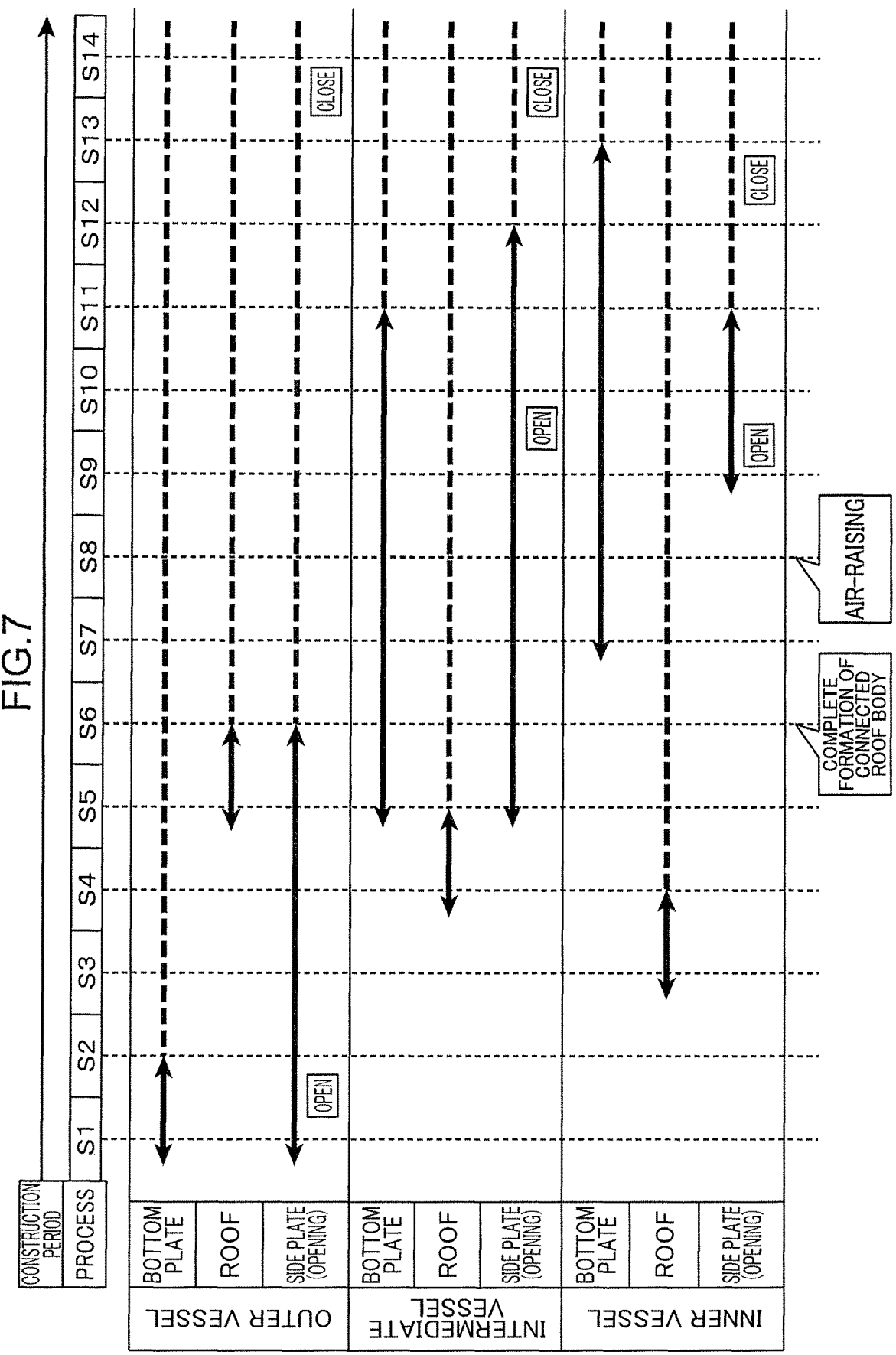
FIG. 7 is a process chart showing an example of a method for constructing a triple shell tank applied with an opening method for a construction opening according to the present disclosure.

Next, the method for constructing the triple shell tank 1 illustrated in FIG. 1 will be described. FIG. 7 is a process chart showing one embodiment of the method for constructing the triple shell tank 1 including processes of opening and sealing of the first opening OP1, the second opening OP2, and the third opening OP3 described above. Here, an example in which the triple shell tank 1 is constructed by stacking of side plate pieces related to the third embodiment of FIGS. 4A, 4B, and 5 is given.

FIG. 7 shows the relationship between processes S1 to S14 performed during the construction period of the triple shell tank 1 and the construction time of each part of the triple shell tank 1. Specifically, for each of the bottom plates 21, 31, and 41, the roofs 23, 33, and 43, and the side plates 22, 32, and 42 of the outer tank 2, the intermediate tank 3, and the inner tank 4, the construction period during which the main construction work is actually performed is indicated by the solid arrows, and the period after the construction is indicated by the dotted lines, each of which is shown in FIG. 2. Regarding the side plates 22, 32, and 42, opening timings of the first opening OP1, the second opening OP2, and the third opening OP3, which are construction entrances, are indicated as "open", and sealing timings of them are indicated as "close". Note that processes S1 to S14 are not necessarily divided in units of processes serving as a division of a tank construction procedure, and the progress status of construction may be simply divided as "process".

In the construction method of the present embodiment, a connected roof body formed by temporarily fixing the intermediate tank roof 33 and the inner tank roof 43 to the outer tank roof 23 is formed by ground work (process S6), and the connected roof body is floated by air-raising (process S8). FIGS. 8 to 21 are views schematically illustrating construction states of the triple shell tank 1 in processes S1 to S14 illustrated in FIG. 7, respectively. FIGS. 8 to 21 illustrate, with a cross section, a part corresponding to half from a radial center RC of the triple shell tank 1. Hereinafter, each of processes S1 to S14 will be described with reference to FIGS. 3 to 16.

<Process S1>

Figure 8:
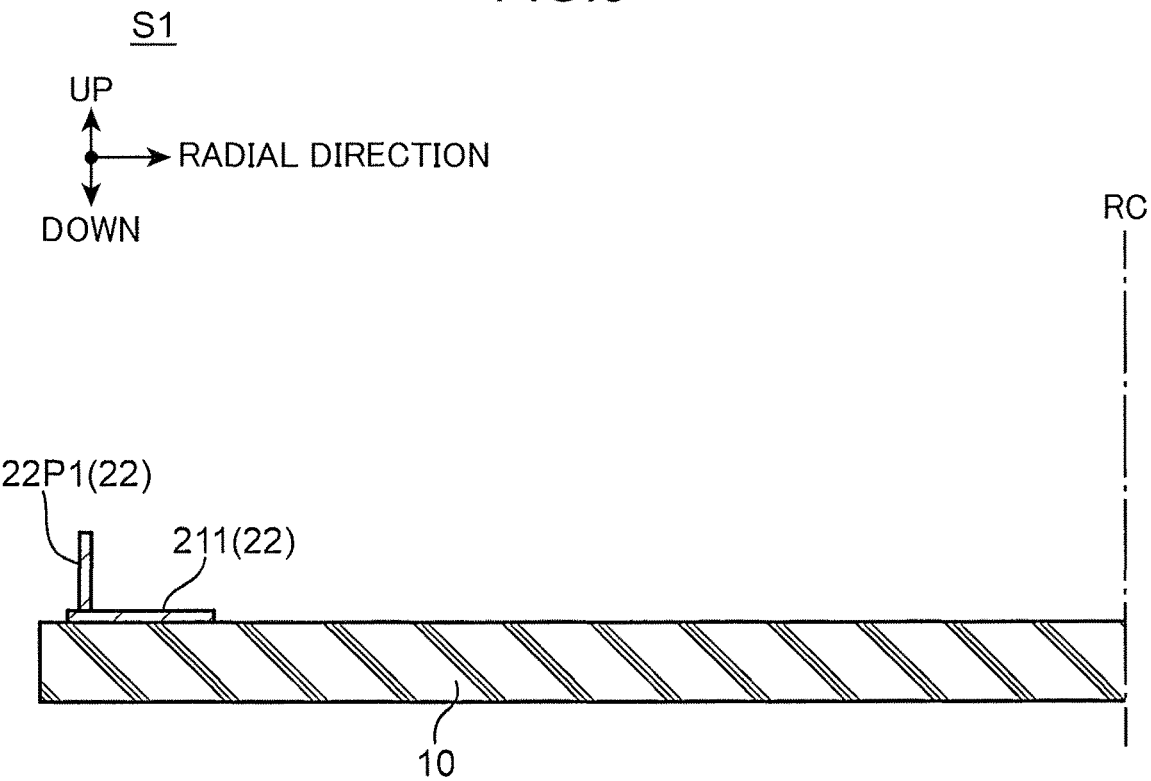
FIG. 8 is a view illustrating, with a cross section of half of the tank, one process of the method for constructing the triple shell tank.

FIG. 8 illustrates a construction status in process S1. In process S1, a part of the outer tank 2 is installed on the tank base 10. Specifically, an outer tank annular 211 constituting a part of the outer tank bottom plate 21 and an outer tank side plate piece 22P1 constituting a part of the outer tank side plate 22 are installed in the vicinity of a peripheral edge part of the tank base 10. The outer tank annular 211 constitutes a circular part in the vicinity of the outer periphery of the outer tank bottom plate 21 having a disk shape, and becomes a portion positioned below the first ring portion 25. The outer tank annular 211 has a plate thickness thicker than other part of the outer tank bottom plate 21 in order to improve load bearing property. FIG. 8 illustrates the outer tank side plate piece 22P1 constituting the lowermost circular step of the outer tank side plate 22.

<Process S2>

Figure 9:
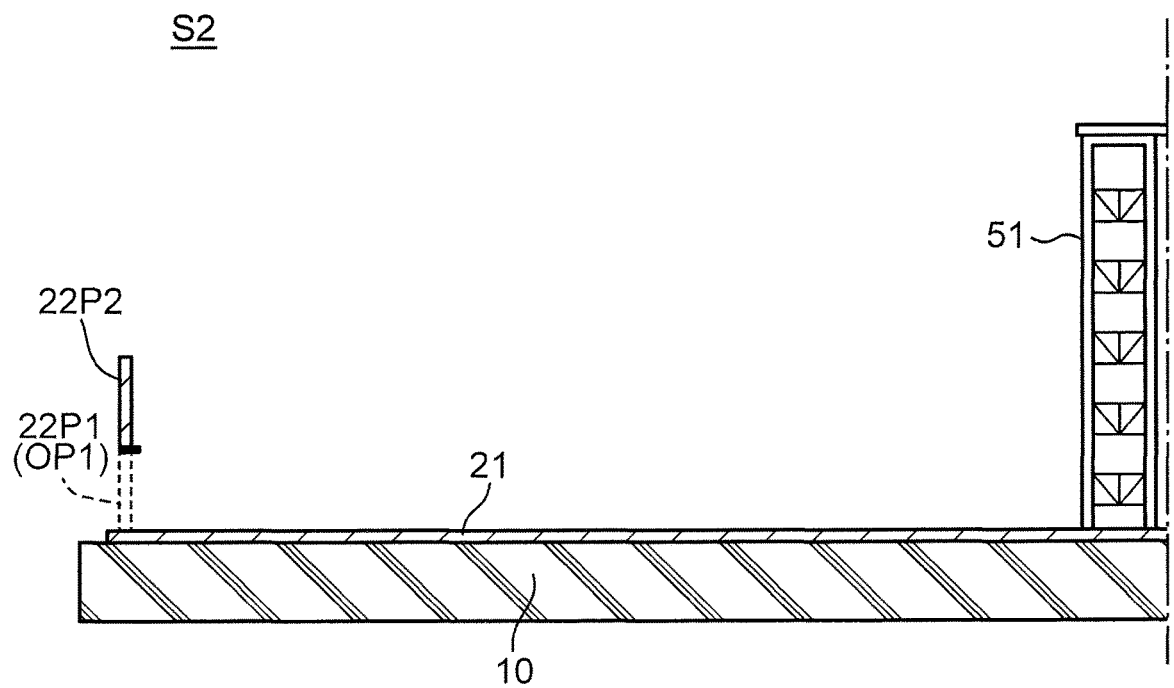
FIG. 9 is a view illustrating one process of the method for constructing the triple shell tank.

FIG. 9 illustrates a construction status in process S2. In process S2, construction of the outer tank bottom plate 21 and the outer tank side plate 22 is performed. Regarding the outer tank bottom plate 21, a radially inner part of the outer tank annular 211 is laid. This inner part is a part positioned immediately below the outer bottom portion cool layer 26. Although not illustrated in FIG. 9, the first level concrete layer 24 illustrated in FIG. 1 is placed on the outer tank bottom plate 21 after being laid. First, a part of the first level concrete layer 24 is placed on the outer tank annular 211. Thereafter, after the inner tank roof 43 and the intermediate tank roof 33 are installed to eliminate the risk of rainwater infiltration, the remaining part of the first level concrete layer 24 is placed on the inner part of the outer tank annular 211.

Regarding the outer tank side plate 22, an outer tank side plate piece 22P2 constituting a second circular step is installed on the outer tank side plate piece 22P1 constituting the lowermost circular step. Note that after installation of the second circular step, a lower half of the first opening OP1 (first construction opening) is opened in the lowermost circular step. As described above, the first opening OP1 is opened by removal of the outer tank side plate piece 22P1. Specifically, after the plurality of outer tank side plate pieces 22P1 are arranged in a circular shape to once form a circular step, only the outer tank side plate piece 22P1 corresponding to the position of the first opening OP1 is not welded to the adjacent piece, and is removed from the circular step.

A center roof support 51 is placed in the vicinity of the radial center RC of the outer tank bottom plate 21. The center roof support 51 is a frame for enabling the dome type inner tank roof 43 to be installed on the ground side before air-raising.

<Process S3>

Figure 10:
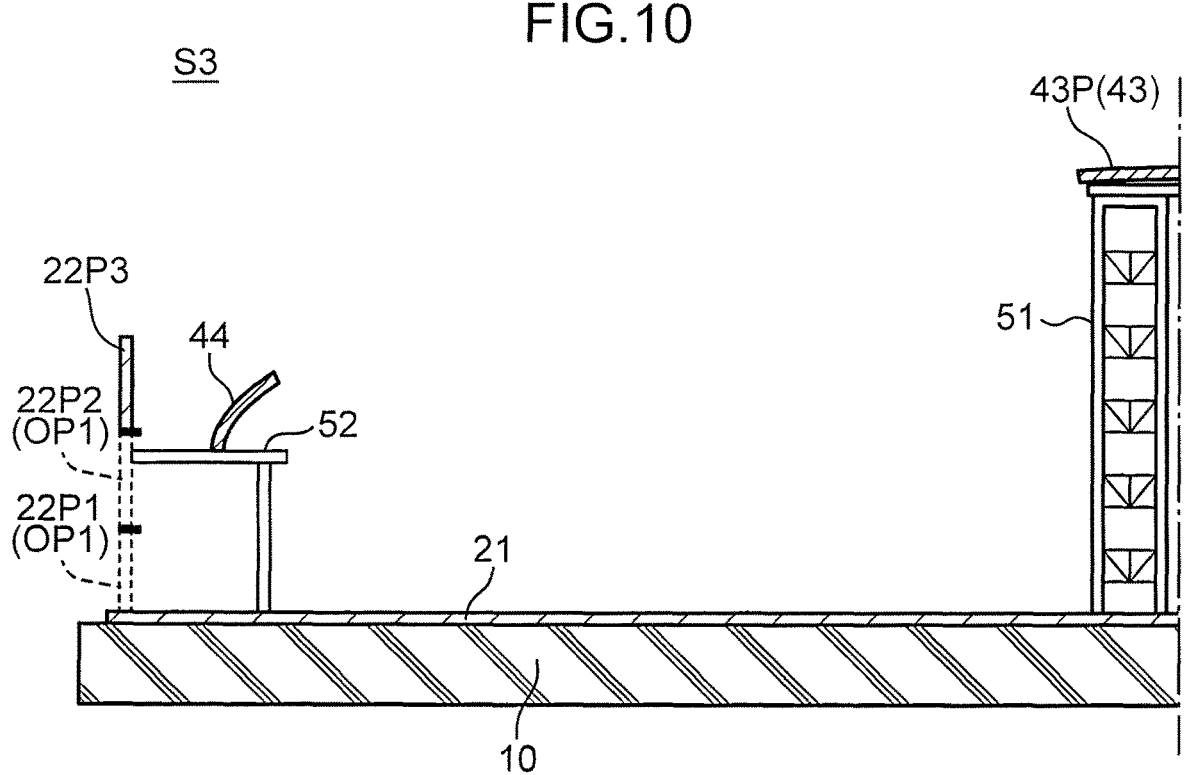
FIG. 10 is a view illustrating one process of the method for constructing the triple shell tank.

FIG. 10 illustrates a construction status in process S3. In process S3, the construction of the outer tank side plate 22 is continued, and installation of the inner tank roof 43 is started. Regarding the outer tank side plate 22, an outer tank side plate piece 22P3 constituting a third circular step is installed on the outer tank side plate piece 22P2 constituting the second circular step. Similarly to the above, after installation of the third circular step, an upper half of the first opening OP1 is opened by removal of the outer tank side plate piece 22P2 of the second circular step. The outer tank side plate piece 22P2 to be pulled out is a piece positioned immediately above the outer tank side plate piece 22P1 pulled out for opening the first opening OP1 in the lowermost circular step.

Regarding the inner tank roof 43, an inner tank roof piece 43P constituting the vicinity of the radial center of the inner tank roof 43 is installed on the center roof support 51 placed in the previous process S2. On the other hand, an outer periphery roof support 52 is placed on the upper surface in the vicinity of the radially outer periphery of the outer tank bottom plate 21. The outer periphery roof support 52 is a frame temporarily supporting the outer peripheral lower edge of the inner tank roof 43 and the intermediate tank roof 33. An inner tank knuckle plate 44 is installed on the upper surface of the outer periphery roof support 52. The inner tank knuckle plate 44 is a plate connecting the upper end of the inner tank side plate 42 and the outer peripheral lower edge of the inner tank roof 43.

<Process S4>

Figure 11:
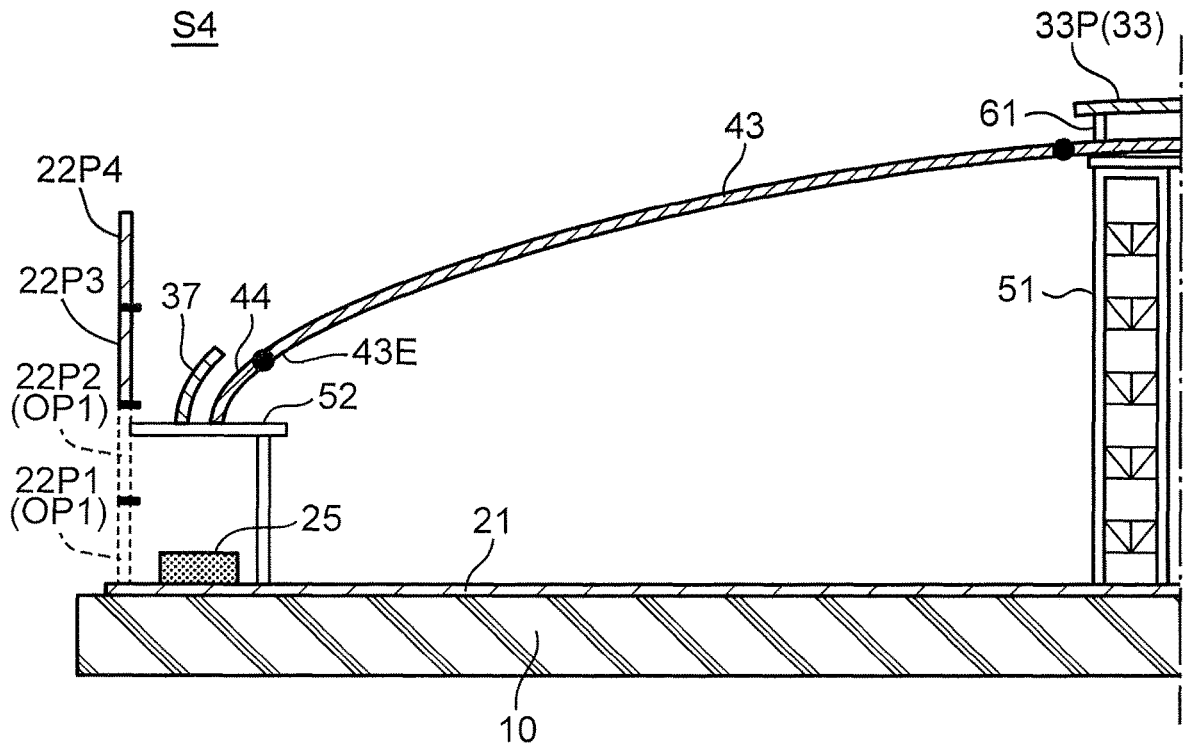
FIG. 11 is a view illustrating one process of the method for constructing the triple shell tank.

FIG. 11 illustrates a construction status in process S4. In process S4, the installation of the inner tank roof 43 is continued, and installation of the intermediate tank roof 33 is started. Regarding the inner tank roof 43, the inner tank roof 43 having a dome shape is finally formed by connecting between the inner tank roof piece 43P at the radial center placed in process S3 and the inner tank knuckle plate 44 by an inner tank roof block assembled in advance by ground work. The inner tank roof block includes a roof skeleton serving as a support frame and a plurality of roof plates attached to this roof skeleton. An outer peripheral edge 43E of the inner tank roof 43 is fixed to the upper end of the inner tank knuckle plate 44. At this time point, the inner tank roof 43 is supported by the outer periphery roof support 52 and brought into a self-standing state, and therefore the center roof support 51 is removed.

Regarding the intermediate tank roof 33, an intermediate tank roof piece 33P constituting the vicinity of the radial center of the intermediate tank roof 33 is installed on a radial center portion of the inner tank roof 43 completed in process S3. In this installation, an intermediate tank roof support 61 is used. The intermediate tank roof support 61 is interposed between the inner tank roof 43 and the intermediate tank roof 33, and temporarily fixes the both at a predetermined interval. As the intermediate tank roof support 61, a member having rigidity such as H steel can be used. The temporary fixing can be performed in an aspect in which, for example, the lower end part of the H steel is welded and fixed to the inner tank roof 43 via a predetermined backing plate, and the intermediate tank roof piece 33P is placed and fixed on the upper end part of the H steel.

Installation of the outer tank side plate 22 is also continued in a timely manner. FIG. 11 illustrates a state in which an outer tank side plate piece 22P4 constituting the fourth circular step is installed. An intermediate tank knuckle plate 37 is installed on the upper surface of the outer periphery roof support 52. The intermediate tank knuckle plate 37 is a plate connecting the upper end of the intermediate tank side plate 32 and the outer peripheral lower edge of the intermediate tank roof 33. Furthermore, blocks constituting the first ring portion 25 are laid on the upper surface in the vicinity of the radially outer periphery of the outer tank bottom plate 21.

<Process S5>

Figure 12:
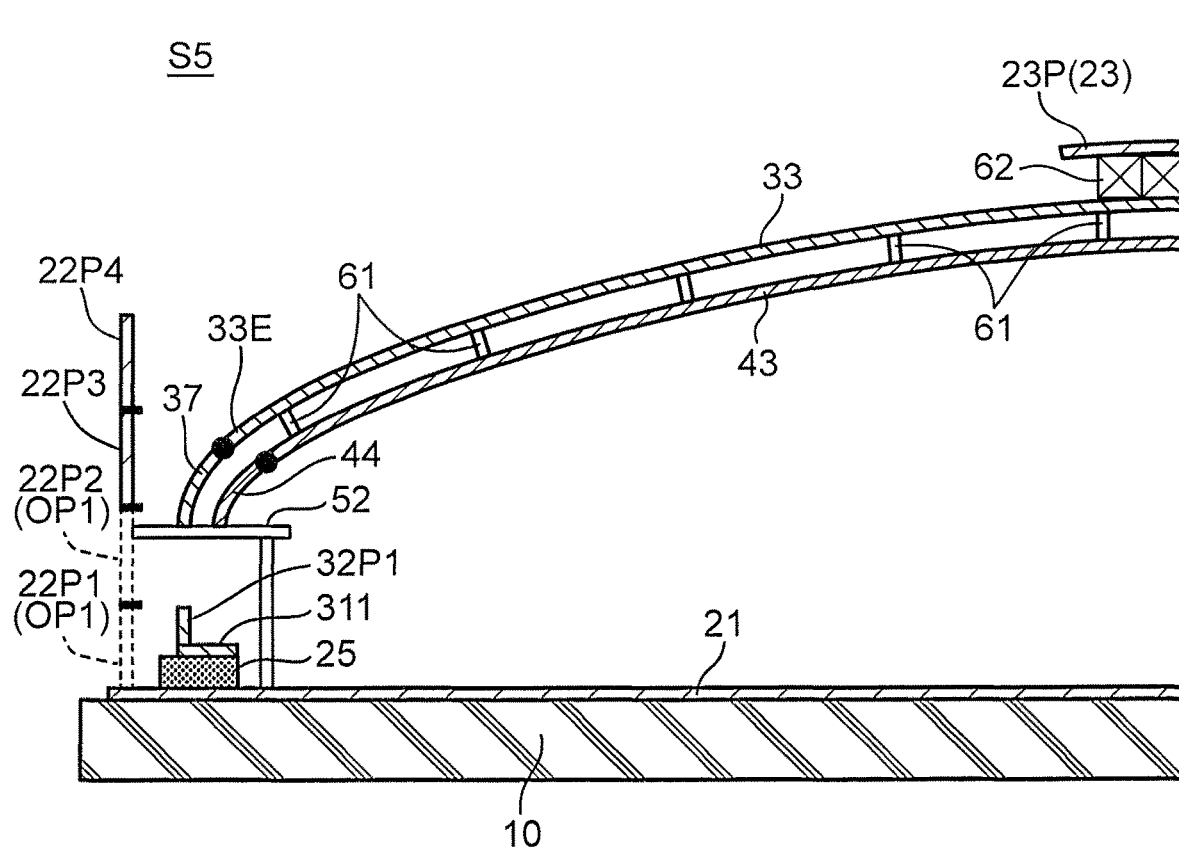
FIG. 12 is a view illustrating one process of the method for constructing the triple shell tank.

FIG. 12 illustrates a construction status in process S5. In process S5, the installation of the intermediate tank roof 33 is continued, and installation of the outer tank roof 23 is started. Installation of the intermediate tank bottom plate 31 and the intermediate tank side plate 32 is started. Regarding the intermediate tank roof 33, the intermediate tank roof 33 having a dome shape is finally formed by connecting between the intermediate tank roof piece 33P at the radial center placed in process S4 and the intermediate tank knuckle plate 37 by an intermediate tank roof block assembled in advance by ground work. Similarly to the inner tank roof block described above, the intermediate tank roof block includes a roof skeleton and a plurality of roof plates. During the placement of this intermediate tank roof block, the intermediate tank roof support 61 is disposed at an appropriate location between the intermediate tank roof 33 and the inner tank roof 43, and the both are temporarily fixed. An outer peripheral edge 33E of the intermediate tank roof 33 is fixed to the upper end of the intermediate tank knuckle plate 37.

Regarding the outer tank roof 23, an outer tank roof piece 23P constituting the vicinity of the radial center of the outer tank roof 23 is installed on a radial center portion of the intermediate tank roof 33 completed in process S4. In this installation, an outer tank roof center support 62 is used. The outer tank roof center support 62 is interposed between the intermediate tank roof 33 and the outer tank roof piece 23P at the radial center, and temporarily fixes the both at a predetermined interval. As the outer tank roof center support 62, a frame or the like in which H steel or a steel material is assembled in a truss structure can be used. The temporary fixing can be performed in an aspect in which the lower end part of the H steel or the like is welded and fixed to the intermediate tank roof 33 via a predetermined backing plate, and the outer tank roof piece 23P is placed and fixed on the upper end part of the H steel or the like.

The intermediate tank annular 311 constituting a part of the intermediate tank bottom plate 31 and the intermediate tank side plate piece 32P1 constituting the lowermost circular step of the intermediate tank side plate 32 are installed on the first ring portion 25 placed in the previous process S4. The intermediate tank annular 311 is a circular part in the vicinity of the outer periphery of the intermediate tank bottom plate 31 having a disk shape, and has a plate thickness thicker than the other part of the intermediate tank bottom plate 31. The intermediate tank side plate piece 32P1 is erected vertically upward from a radially outer peripheral edge of the intermediate tank annular 311. As described above, the intermediate tank side plate piece 32P1 is also a side plate piece that matches the height of the second circular step of the intermediate tank side plate 32 with the height of the lowermost circular step of the inner tank side plate 42.

<Process S6>

Figure 13:
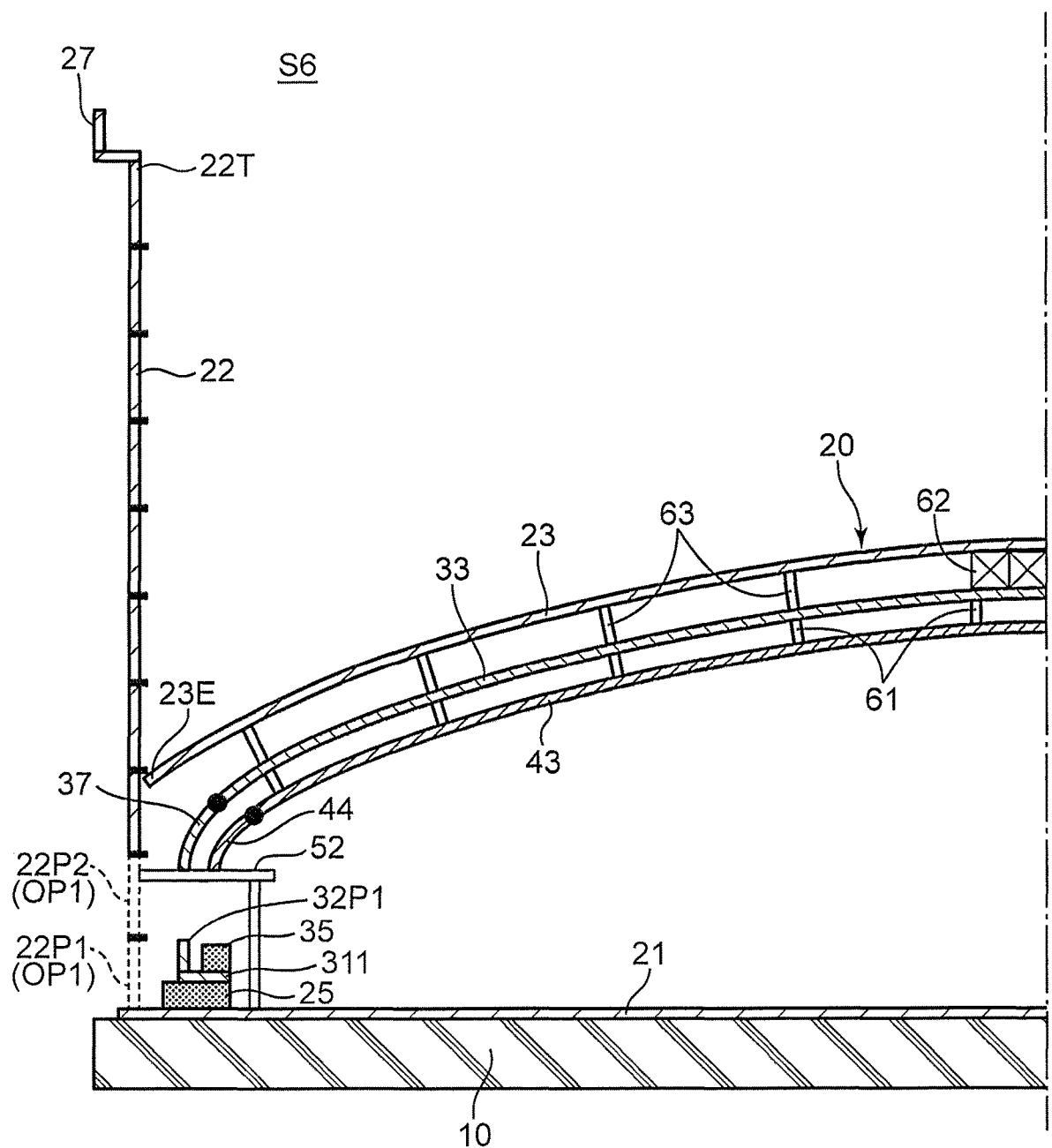
FIG. 13 is a view illustrating one process of the method for constructing the triple shell tank.

FIG. 13 illustrates a construction status in process S6. In process S6, installation of the outer tank roof 23 is continued, and finally a connected roof body 20 in which the three roofs are integrated is formed. Installation up to a predetermined height of the outer tank side plate 22 is performed. Regarding the outer tank roof 23, the outer tank roof 23 having a dome shape is finally formed by connecting the outer tank roof block assembled in advance by ground work to the outer tank roof piece 23P at the radial center placed in process S5. During this extension, an outer tank roof periphery support 63 made of H steel or the like is disposed at an appropriate location between the intermediate tank roof 33 and the outer tank roof 23, and the both are temporarily fixed.

At the time point when the installation of the outer tank roof 23 is completed, the formation of the connected roof body 20 is brought into a completed state. That is, the connected roof body 20 is formed by temporarily fixing the intermediate tank roof 33 on the inner tank roof 43 by the intermediate tank roof support 61, and temporarily fixing the outer tank roof 23 on the intermediate tank roof 33 by the outer tank roof center support 62 and the outer tank roof periphery support 63. Formation of such a connected roof body 20 enables these three roofs to be integrally air-raised. The supports 61, 62, and 63 described above serve as support members of the upper roof until completion of air-raising, but serve as suspension members of the lower roof after air-raising.

Note that in the formation state of the connected roof body 20, a gap between the inner tank roof 43 and the intermediate tank roof 33 and a gap between the intermediate tank roof 33 and the outer tank roof 23 are set slightly narrower than the gap between them in the triple shell tank 1 after completion. This is to facilitate the fixing work of the inner tank roof 43 to the inner tank side plate 42 and the fixing work of the intermediate tank roof 33 to the intermediate tank side plate 32, which are executed after air-raising.

Regarding the outer tank side plate 22, installation is completed by stacking a predetermined number of circular steps formed by the side plate pieces. Due to this, the outer tank side plate 22 having a predetermined height is installed around the connected roof body 20, and preparation for air-raising is brought into an enabled state. An outer periphery corridor 27 is installed on a top part 22T of the outer tank side plate 22. On the intermediate tank annular 311, a part of the second level concrete layer 34, which is not illustrated here, is placed, and a block constituting the second ring portion 35 is laid.

<Process S7>

Figure 14:
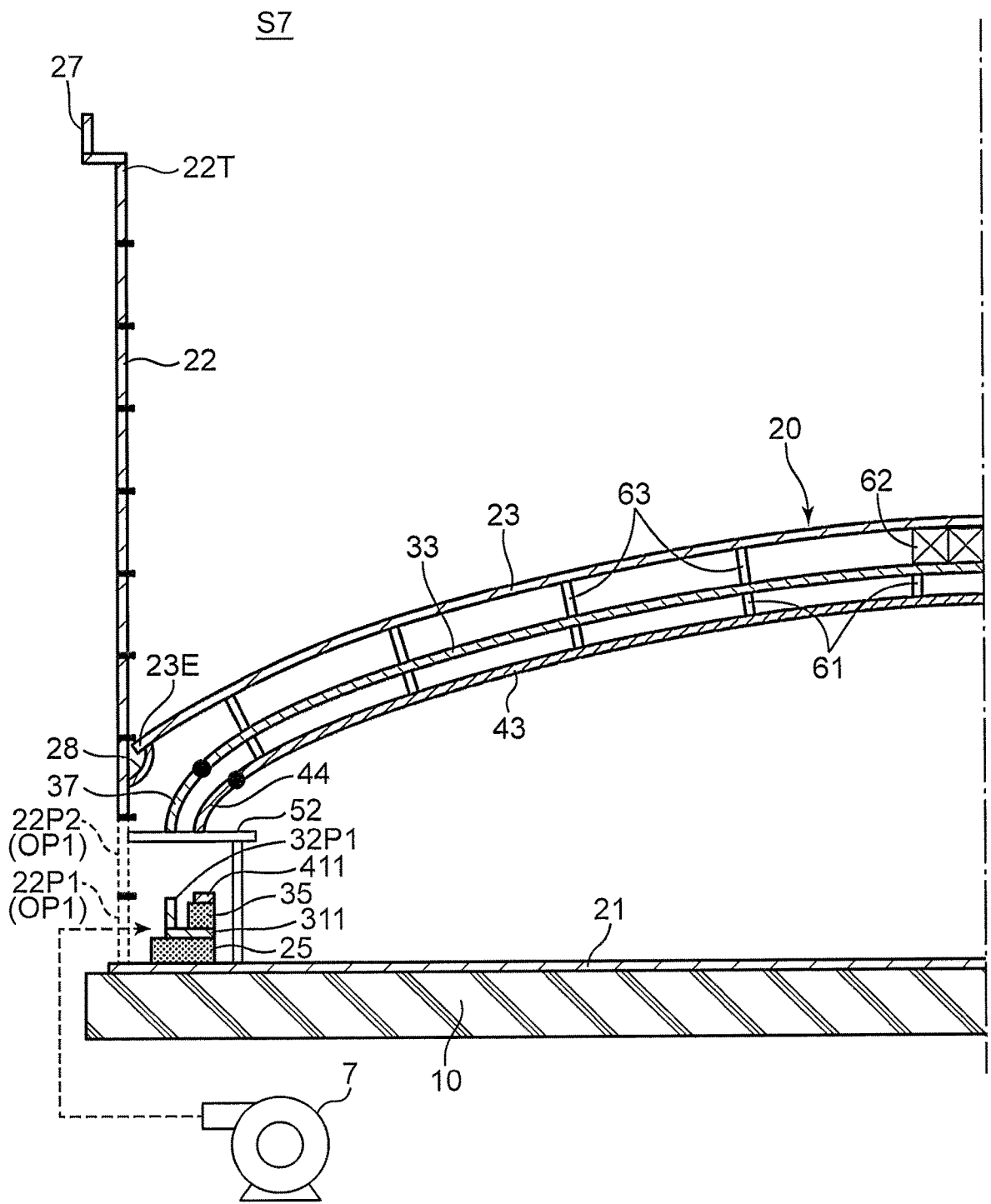
FIG. 14 is a view illustrating one process of the method for constructing the triple shell tank.

FIG. 14 illustrates a construction status in process S7. In process S7, preparation work for air-raising is mainly performed. In order to form a sealed space, an outer peripheral edge 23E of the outer tank roof 23 is subjected to a sealing process of attaching a sealing material 28. The sealing material 28 seals a gap between the outer peripheral edge 23E and the inner face of the outer tank side plate 22. On the outer side of the outer tank side plate 22, a blower 7 that supplies air for air-raising is prepared. A blowing duct is connected to an air delivery port of the blower 7, and this blowing duct is drawn into the inner side of the outer tank side plate 22 through the first opening OP1. Note that the first opening OP1 is also subjected to a sealing process for sealing around the blowing duct. Since the outer tank bottom plate 21 has already been completed before process S7, a sealing process of the bottom surface portion is not particularly necessary. Accordingly, at this time point, the space surrounded by the outer tank bottom plate 21, the outer tank side plate 22, and the outer tank roof 23 is sealed.

In parallel with the above air-raising preparation work, an inner tank annular 411 is installed on the upper surface of the second ring portion 35. The inner tank annular 411 is a circular part in the vicinity of the outer periphery of the inner tank bottom plate 41 having a disk shape.

<Process S8>

Figure 15:
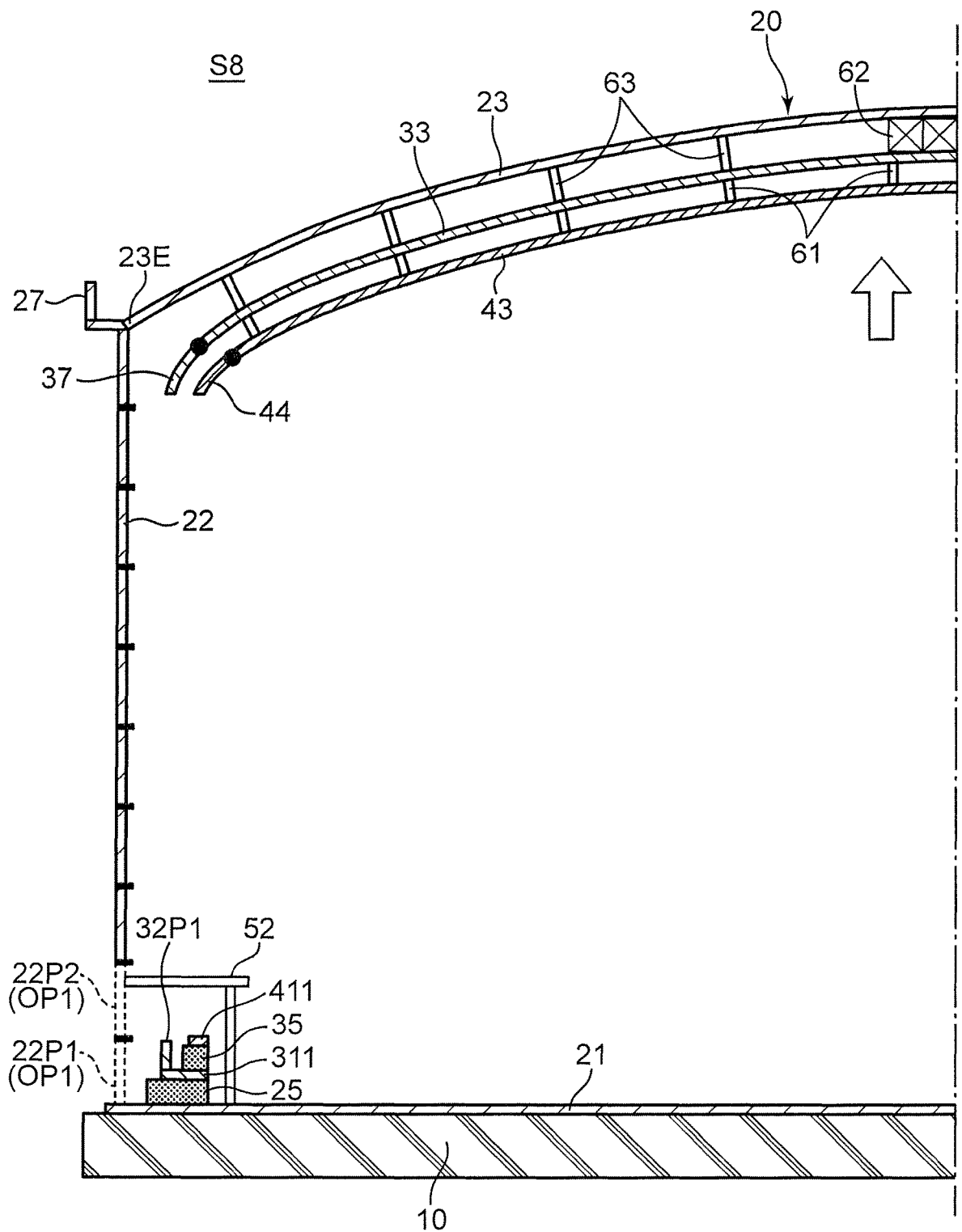
FIG. 15 is a view illustrating one process of the method for constructing the triple shell tank.

FIG. 15 illustrates a state after performing of air-raising in process S8. In executing air-raising, the blower 7 illustrated in FIG. 14 is operated, and air is supplied to the sealed space surrounded by the outer tank bottom plate 21, the outer tank side plate 22, and the outer tank roof 23. Air pressure in the sealed space is increased by air supply, and the connected roof body 20 is floated by the pressure. At this time, the outer tank side plate 22 plays a role as a guide of the floating connected roof body 20.

It is the outer tank roof 23 that directly floats by air-raising. However, the inner tank roof 43 and the intermediate tank roof 33 are integrated with the outer tank roof 23 in advance by the temporary supports 61, 62, and 63. Accordingly, the inner tank roof 43 and the intermediate tank roof 33 are also integrally floated in an aspect of being suspended from the outer tank roof 23. That is, since the connected roof body 20 is formed in advance, the three roofs 23, 33, and 43 forming the triple shell structure can be floated at once by one time of air-raising. Note that at the time of air-raising, the floating attitude of the connected roof body 20 is controlled using a balance wire.

After the air-raising, the outer peripheral edge 23E of the outer tank roof 23 is fixed to the upper end of the outer tank side plate 22. At this time point, the temporary fixing of the connected roof body 20 is not released, and the inner tank roof 43 and the intermediate tank roof 33 remain in a state of being suspended from the outer tank roof 23. Equipment for air-raising is removed. That is, the sealing material 28 attached to the vicinity of the outer peripheral edge 23E of the outer tank roof 23 is detached, and the blower 7 and the air blowing duct are removed.

<Process S9>

Figure 16:
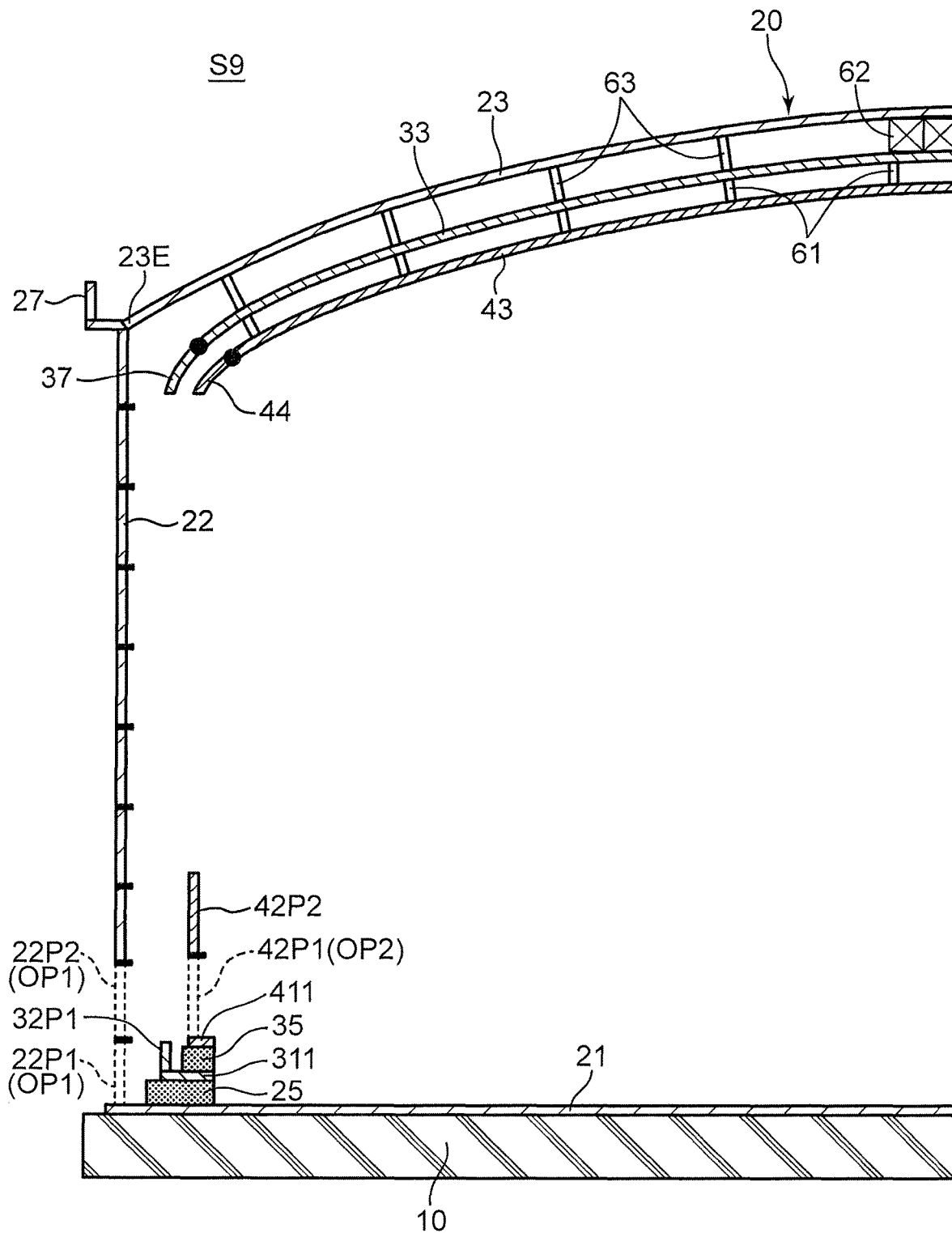
FIG. 16 is a view illustrating one process of the method for constructing the triple shell tank.

FIG. 16 illustrates a construction status in process S9. In process S9, installation of the inner tank side plate 42 is started. An inner tank side plate piece 42P1 constituting the lowermost circular step of the inner tank side plate 42 is installed on the inner tank annular 411. The inner tank side plate piece 42P1 is erected vertically upward from a radially outer peripheral edge of the inner tank annular 411. FIG. 16 illustrates a state in which the inner tank side plate piece 42P2 constituting a second circular step is installed on the lowermost inner tank side plate piece 42P1.

When the inner tank side plate 42 is installed, a second opening OP2 (second construction opening) is provided as a construction opening. The second opening OP2 is opened by pulling out one or a plurality of the plurality of inner tank side plate pieces 42P1 constituting the lowermost circular step. As described with reference to FIGS. 4 and 5, the opening position of the second opening OP2 is a position overlapping, in the circumferential direction and the height direction, the first opening OP1 opened in the outer tank side plate 22.

<Process S10>

Figure 17:
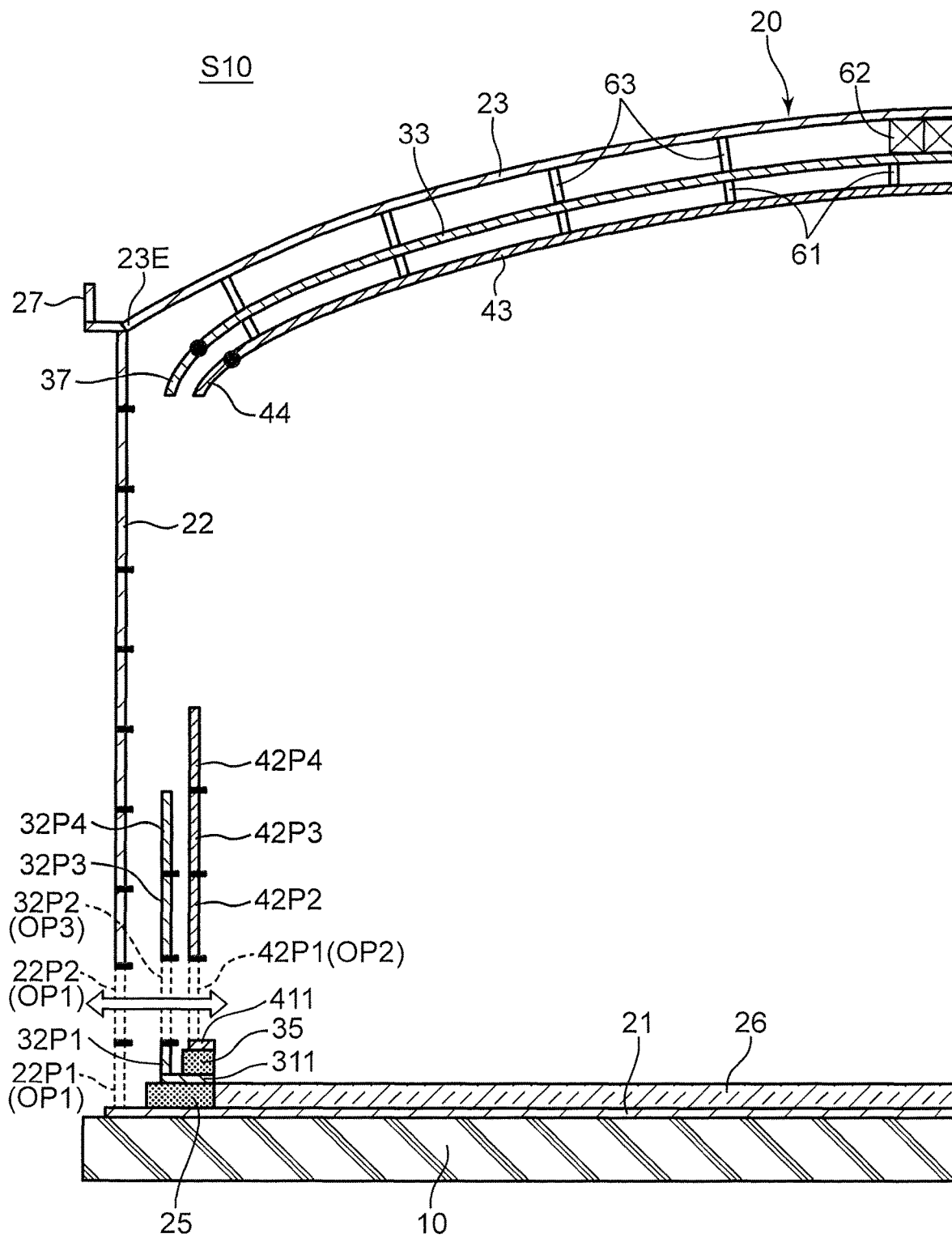
FIG. 17 is a view illustrating one process of the method for constructing the triple shell tank.

FIG. 17 illustrates a construction status in process S10. In process S10, the inner tank side plate 42 and the intermediate tank side plate 32 are installed. Regarding the inner tank side plate 42, an inner tank side plate piece 42P3 constituting the third circular step is installed on the inner tank side plate piece 42P2 constituting the second circular step. Furthermore, the side plate height is sequentially raised in such a manner that a fourth inner tank side plate piece 42P4 is installed thereon.

Similarly, also regarding the intermediate tank side plate 32, the intermediate tank side plate pieces 32P2, 32P3, and 32P4 constituting the second, third, and fourth circular steps are sequentially stacked on the installed lowermost intermediate tank side plate piece 32P1. In the present embodiment, an inner tank side plate piece 42Pn and an intermediate tank side plate piece 32Pn (excluding the side plate piece 32P1 for height matching) have the same height width. Accordingly, the inner tank side plate pieces 42P1, 42P2, and 43P3 and the intermediate tank side plate pieces 32P2, 32P3, and 32P4 illustrated in FIG. 17 are positioned at the same height position, respectively.

In process S10, the circular step of any one of the inner tank side plate 42 and the intermediate tank side plate 32 may be stacked first and then the circular step of the other may be stacked, but it is desirable to stack the circular steps of the inner tank side plate 42 and the intermediate tank side plate 32 simultaneously in parallel. For example, after the second inner tank side plate piece 42P2 of the inner tank side plate 42 is stacked, the third intermediate tank side plate piece 32P3 of the intermediate tank side plate 32 is stacked, and subsequently the third inner tank side plate piece 42P3 of the inner tank side plate 42 is stacked. Adoption of such an installation method can achieve improvement of work efficiency such as sharing a scaffold in installation of the inner tank side plate 42 and the intermediate tank side plate 32. For convenience of crane lifting work and assembling work of the side plate pieces, it is desirable that stacking of the inner tank side plate pieces 42Pn positioned on the radially inner side precede stacking of the intermediate tank side plate pieces 32Pn.

The third opening OP3 (third construction opening) is provided as a construction opening also when the intermediate tank side plate 32 is installed. The third opening OP3 is opened by pulling out one or a plurality of the intermediate tank side plate pieces 32P2 constituting the second circular step. As indicated by "open" in the chart of FIG. 7, at the time point of process S10, the second opening OP2 is opened in the inner tank side plate 42, and the third opening OP3 is opened in the intermediate tank side plate 32. This secures, as indicated by the arrow in FIG. 17, a horizontal and linear work traffic line penetrating the three side plates 22, 32, and 42 through the first opening OP1, the second opening OP2, and the third opening OP3.

In process S10, the first level concrete layer 24 not illustrated in FIG. 17 and the outer bottom portion cool layer 26 are sequentially laid further on the outer tank bottom plate 21. Since the part on the outer tank annular 211 of the first level concrete layer 24 has been constructed in process S2, the remaining part is constructed. As described above, the outer bottom portion cool layer 26 is installed by paving a heat insulating blocking material such as, for example, foam glass on the inside of the first ring portion 25.

<Process S11>

Figure 18:
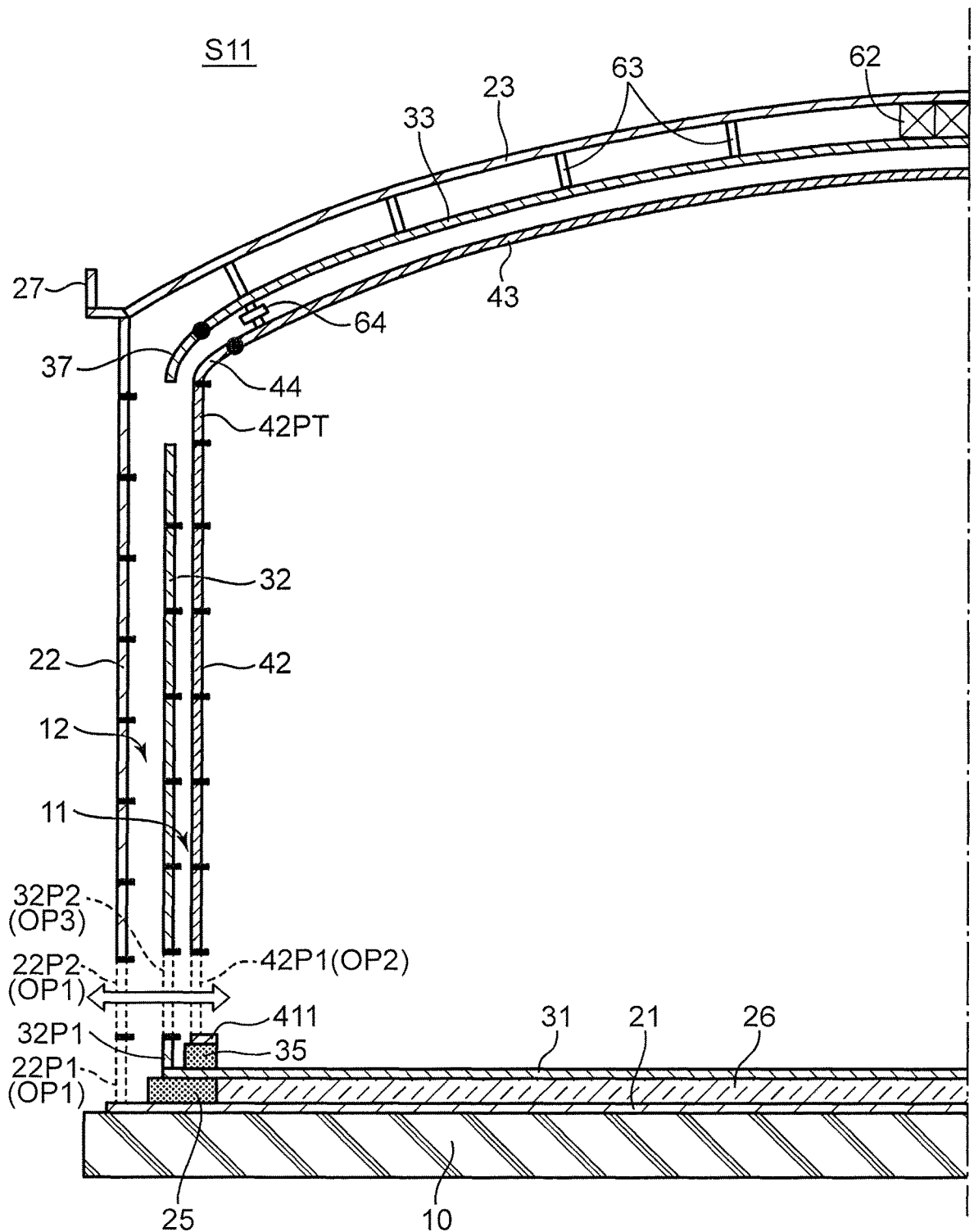
FIG. 18 is a view illustrating one process of the method for constructing the triple shell tank.

FIG. 18 illustrates a construction status in process S11. In process S11, installation continuation of the inner tank side plate 42 and the intermediate tank side plate 32, fixing of the inner tank side plate 42 and the inner tank roof 43, and laying of the intermediate tank bottom plate 31 are performed. Regarding the inner tank side plate 42 and the intermediate tank side plate 32, installation in the middle step to the upper step of the respective circular steps is performed. FIG. 18 illustrates a state in which in the inner tank side plate 42, an inner tank side plate piece 42PT constituting the uppermost circular step is assembled prior to the intermediate tank side plate 32 by one step.

After the installation of the uppermost inner tank side plate piece 42PT, work of fixing the outer peripheral edge of the inner tank roof 43 to the upper end of the inner tank side plate 42 is performed. Prior to this fixing work, a replacement work of replacing the intermediate tank roof support 61 connecting the intermediate tank roof 33 and the inner tank roof 43 with a first jack 64 is performed. In a state where the outer tank roof 23 is fixed to the outer tank side plate 22 without releasing the temporary fixing of the connected roof body 20 after air-raising, the inner tank roof 43 is suspended from the intermediate tank roof 33 with the intermediate tank roof support 61 at a position higher than a normal height position. This is for securing an adjustment space when the inner tank roof 43 is connected to the inner tank side plate 42.

The first jack 64 is disposed at an appropriate location between the intermediate tank roof 33 and the inner tank roof 43, and suspends and supports the inner tank roof 43 movably up and down after the replacement. The lower end of the inner tank knuckle plate 44 and the upper end of the uppermost inner tank side plate piece 42PT are aligned while the inner tank roof 43 is jacked down with the first jack 64 by the amount of the adjustment space. After the alignment, the both are fixed, and the inner tank 4 is substantially completed.

Furthermore, in process S11, the remaining part of the intermediate tank bottom plate 31 is laid on the outer bottom portion cool layer 26. Regarding the intermediate tank bottom plate 31, since the intermediate tank annular 311 constituting the outer periphery portion has been installed, the intermediate tank bottom plate 31 of the inner part is laid.

<Process S12>

Figure 19:
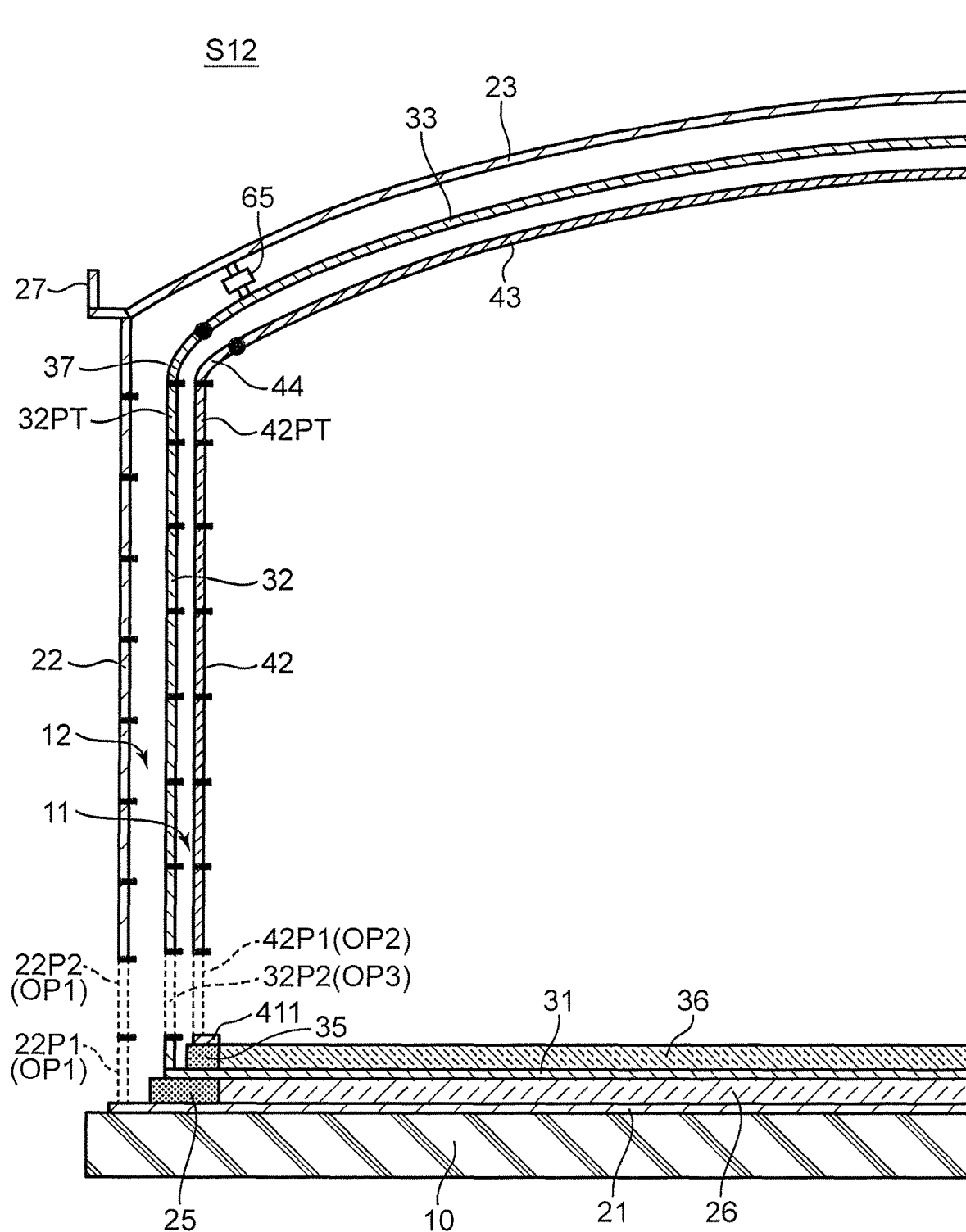
FIG. 19 is a view illustrating one process of the method for constructing the triple shell tank.

FIG. 19 illustrates a construction status in process S12. In process S12, fixing of the intermediate tank side plate 32 and the intermediate tank roof 33, and laying of the inner bottom portion cool layer 36 are performed. Similarly to the inner tank roof 43, a jack down system is also adopted for the fixing of the intermediate tank roof 33. After the inner tank roof 43 is fixed to the inner tank side plate 42, an intermediate tank side plate piece 32PT constituting the uppermost circular step of the intermediate tank side plate 32 is installed. On the other hand, a replacement work of replacing the outer tank roof center support 62 and the outer tank roof periphery support 63 connecting the outer tank roof 23 and the intermediate tank roof 33 with a second jack 65 is performed. The intermediate tank roof 33 is also suspended from the outer tank roof 23 at a position higher than the normal height position by the adjustment space.

The second jack 65 is disposed at an appropriate location between the outer tank roof 23 and the intermediate tank roof 33, and suspends and supports the intermediate tank roof 33 movably up and down after the replacement. The lower end of the intermediate tank knuckle plate 37 and the upper end of the uppermost intermediate tank roof piece 33PT are aligned while the intermediate tank roof 33 is jacked down with the second jack 65 by the amount of the adjustment space. After the alignment, the both are fixed, and the intermediate tank 3 is substantially completed.

In process S12, the inner bottom portion cool layer 36 is laid further on the intermediate tank bottom plate 31 (second level concrete layer 34). The inner bottom portion cool layer 36 is installed by paving a heat insulating blocking material such as, for example, foam glass on the inside of the second ring portion 35.

<Process S13>

Figure 20:
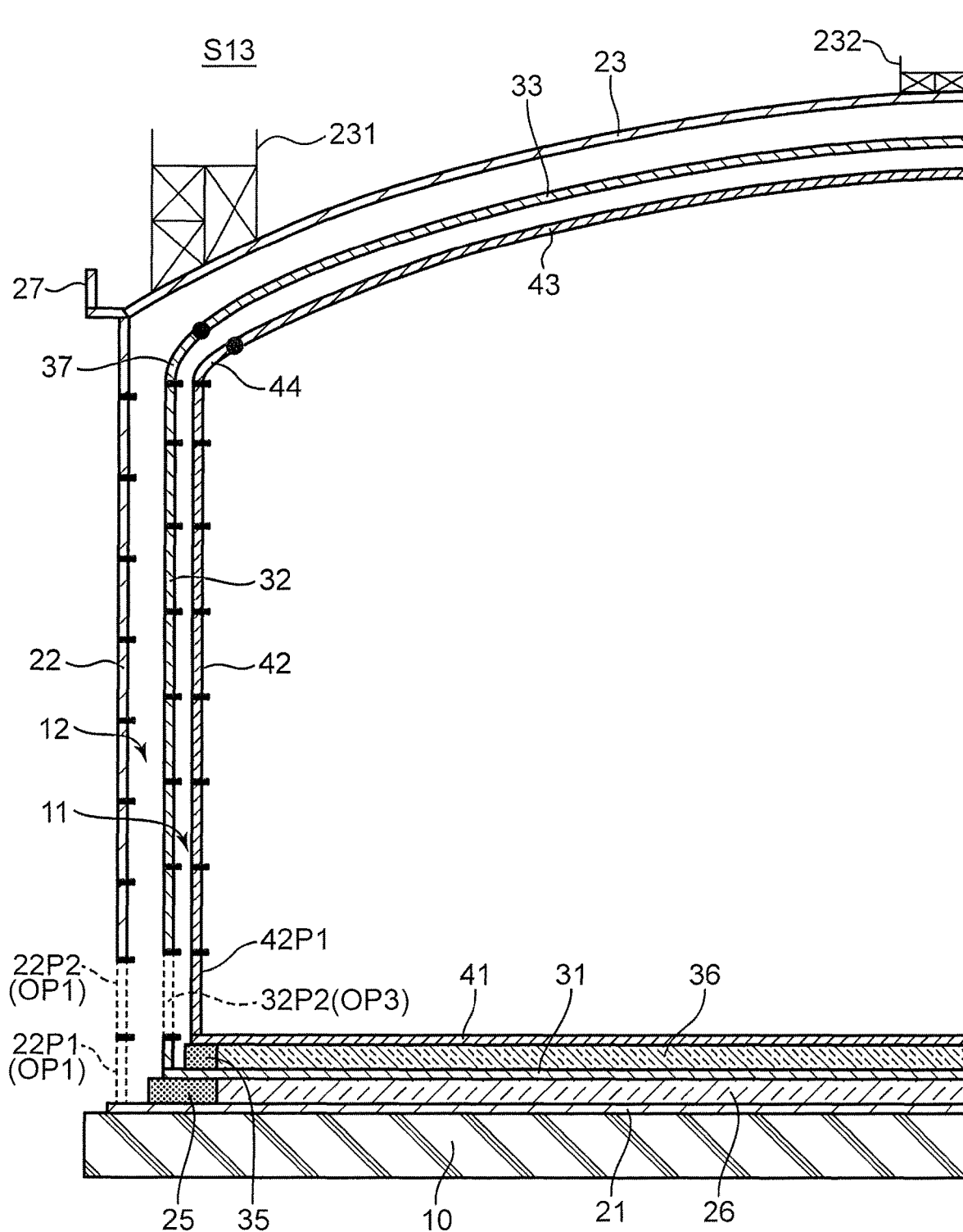
FIG. 20 is a view illustrating one process of the method for constructing the triple shell tank.

FIG. 20 illustrates a construction status in process S13. In process S13, laying of the inner tank bottom plate 41, sealing of the second opening OP2 is sealed, installation of a deck, and the like are performed. The inner tank bottom plate 41 is laid on the inner bottom portion cool layer 36. Regarding the inner tank bottom plate 41, since the inner tank annular 411 constituting the outer periphery portion has been installed, the inner tank bottom plate 41 of the inner part is laid.

After the work inside the inner tank 4 is completed and the scaffold or the like placed inside the inner tank 4 is removed, the second opening OP2 of the inner tank side plate 42 is sealed. This sealing work is work of fitting the inner tank side plate piece 42P1 pulled out from the lowermost circular step in process S9 into the second opening OP2 and welding the inner tank side plate piece 42P1 to a surrounding side plate piece. FIG. 20 illustrates a state in which the second opening OP2 is sealed.

A shoulder part deck 231 and a top part deck 232 are installed on the outer tank roof 23. The shoulder part deck 231 is disposed on a radially outer periphery part of the outer tank roof 23. The top part deck 232 is disposed at the radial center of the outer tank roof 23. Note that the work of filling the first inter-tank 11 and the second inter-tank 12 with a heat insulation material, the work of attaching various pipes and accessories, and the like are also performed.

<Process S14>

Figure 21:
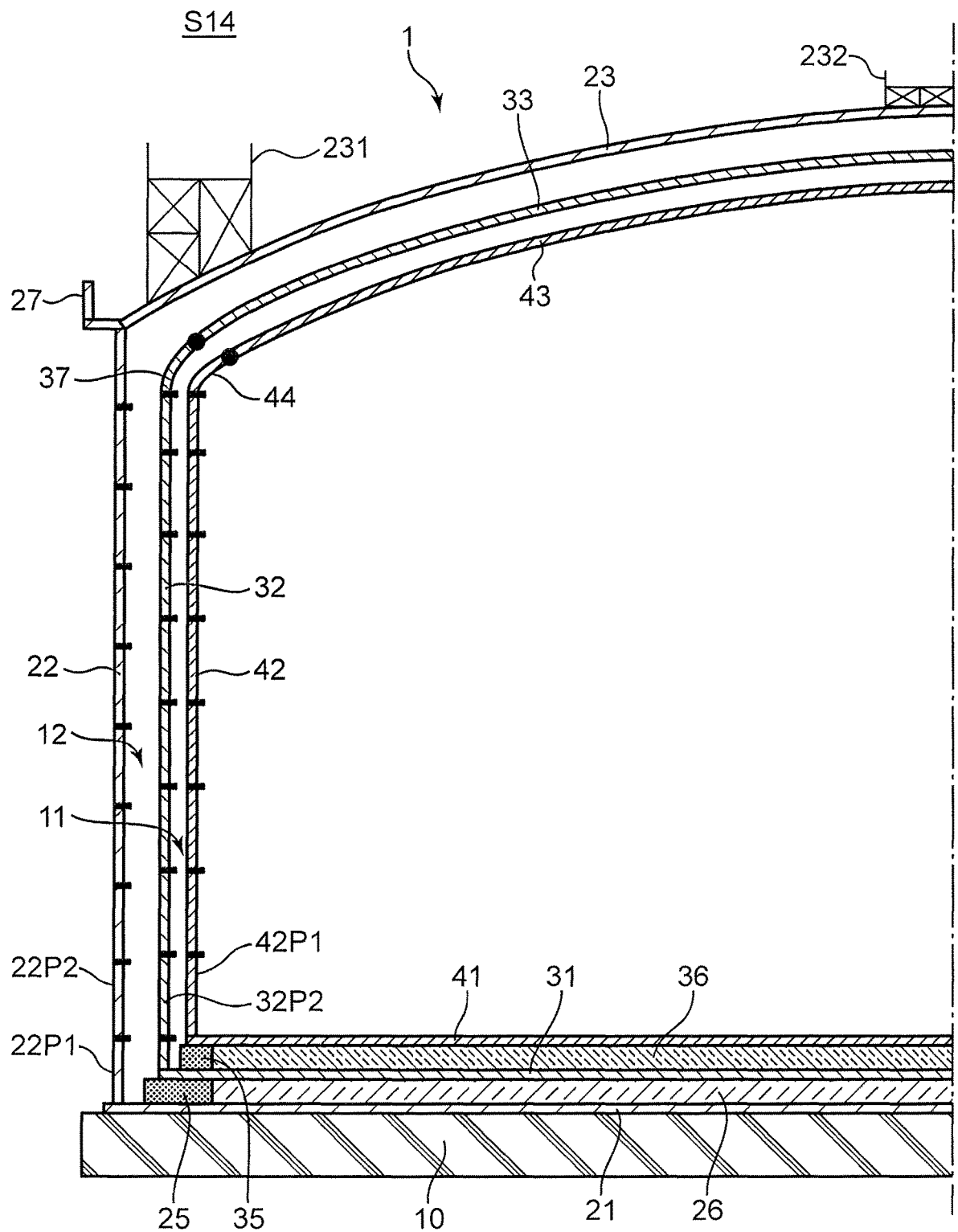
FIG. 21 is a view illustrating one process of the method for constructing the triple shell tank.

FIG. 21 illustrates a construction status in process S14. In process S14, the third opening OP3 and the first opening OP1 are sealed. The third opening OP3 of the intermediate tank side plate 32 is sealed after the work inside the intermediate tank 3 is completed and the scaffold or the like placed inside the intermediate tank 3 is removed. In this sealing work, the intermediate tank side plate piece 32P2 pulled out in process S10 is fitted into the third opening OP3, and the intermediate tank side plate piece 32P2 is welded to a surrounding side plate piece.

Subsequently, after the work inside the outer tank 2 is completed and the scaffold or the like placed inside the outer tank 2 is removed, the first opening OP1 of the outer tank side plate 22 is sealed. In this sealing work, the outer tank side plate pieces 22P1 and 22P2 pulled out in processes S2 and S3 are fitted so as to close the first opening OP1, and are welded. As described above, the construction openings are sequentially sealed upon completing the work in each side plate in the order of the inner second opening OP2, the intermediate third opening OP3, and the outer first opening OP1.

Modified Embodiments

Although the embodiments of the method for constructing a triple shell tank according to the present disclosure have been described above, the present disclosure is not limited to the above embodiments at all. For example, the method for constructing the triple shell tank described above can assume the following modified embodiments.

(1) A necessary construction structure and equipment may be provided in the vicinity of the triple shell tank 1 described above. For example, a dike that suppresses diffusion when liquid in the tank leaks at the time of disaster or the like may be erected around the triple shell tank 1. The dike can be installed with prestressed concrete (PC), for example. The dike may be integrally constructed with the outer tank 2 made of metal. Specifically, an aspect in which the PC constituting the dike is installed in a state of being in close contact with the outer peripheral surface of the outer tank side plate 22 may be adopted. In this case, it is possible to increase the strength of the outer tank side plate 22 serving as a guide during air-raising of the connected roof body 20.

(2) A communication pipe for causing the internal space of the inner tank 4 and the space the first inter-tank 11 to communicate with each other may be attached to the inner tank roof 43. According to this modification, the hydrogen gas vaporized from the liquid hydrogen LH stored in the inner tank 4 can be circulated the first inter-tank 11. That is, the cooling effect can be enhanced by using the stored liquid hydrogen LH.

(3) In the above embodiment, an example in which the connected roof body 20 connecting the three roofs of the inner tank roof 43, the intermediate tank roof 33, and the outer tank roof 23 is air-raised using the outer tank side plate 22 as a guide (outer tank air-raising) has been illustrated. In place of this, a connected roof body in which two roofs of the inner tank roof 43 and the intermediate tank roof 33 are connected may be air-raised using the intermediate tank side plate 32 as a guide (intermediate tank air-raising) or air-raised using the inner tank side plate 42 as a guide (inner tank air-raising).

SUMMARY OF PRESENT DISCLOSURE

The specific embodiments described above include a disclosure having the following configurations.

A method for constructing a triple shell tank according to the present disclosure is a method for constructing a triple shell tank including an inner tank, an intermediate tank, and an outer tank each having a roof and a side plate, the method including processes of: as construction entrances, opening a first construction opening in the outer tank side plate when installing the outer tank side plate, a second construction opening in the inner tank side plate when installing the inner tank side plate, and a third construction opening in the intermediate tank side plate when installing the intermediate tank side plate; and sealing the second construction opening after completion of work inside the inner tank, then sealing the third construction opening after completion of work inside the intermediate tank, and subsequently, sealing the first construction opening after completion of work inside the outer tank, in which the first construction opening, the second construction opening, and the third construction opening are opened so as to at least partially overlap with one another in a circumferential direction and a height direction of the triple shell tank, and the first construction opening and the second construction opening are opened so as to satisfy a relationship of $$AR1 \geq AR2$$

where AR1 is an opening area of the first construction opening and AR2 is an opening area of the second construction opening.

According to this construction method, the first construction opening, the second construction opening, and the third construction opening are opened so as to at least partially overlap with one another in the circumferential direction and the height direction of the triple shell tank. Therefore, it is possible to secure the linearity of the work traffic line penetrating the three side walls of the triple shell tank and directed radially inward or outward, and it is possible to facilitate entry and exit of workers and carrying in of materials. The first construction opening and the second construction opening are opened so as to satisfy a relationship of $AR1 \geq AR2$. The triple shell tank has a shell structure in which the intermediate tank is provided so as to cover the entire inner tank, and the outer tank is provided so as to cover the entire intermediate tank. Therefore, the lowermost position of the side plate becomes the lowest in the outer tank side plate and the highest in the inner tank side plate, and a step in the height direction can occur in the lower end edge of the first construction opening and the lower end edge of the second construction opening. Such a step of the construction opening may interfere with the work. However, by satisfying the relationship of AR1≥AR2, preferably the relationship of AR1>AR2, it is possible to form a construction opening that can reduce the influence of the step.

In the method for constructing a triple shell tank, it is desirable that the first construction opening, the second construction opening, and the third construction opening be opened so as to satisfy a relationship of $$AR1 \geq AR3 \geq AR2$$

where AR3 is an opening area of the third construction opening.

Also in the relationship between the outer tank and the intermediate tank, since the lowermost position of the intermediate tank side plate becomes higher than the lowermost position of the outer tank side plate, a step in the height direction can occur in the lower end edge of the first construction opening and the lower end edge of the third construction opening. Accordingly, by satisfying the relationship of AR1≥AR3≥AR2, preferably the relationship of AR1>AR3≥AR2 or AR1>AR3>AR2, it is possible to open the first construction opening, the second construction opening, and the third construction opening that reduce the influence of the step in the height direction.

In the method for constructing a triple shell tank, it is desirable that the first construction opening and the second construction opening be opened so as to satisfy a relationship of $$H1 \geq H2$$

where H1 and H2 are an opening height of the first construction opening and an opening height of the second construction opening, respectively.

According to this construction method, the opening width in an up-down direction of the first construction opening is set to be equal to or wider than the opening width in an up-down direction of the second construction opening. Therefore, even if a step exists in the height direction between the lowermost position of the outer tank side plate and the lowermost position of the inner tank side plate, it becomes easy to eliminate the step and form a construction opening that can secure a work traffic line extending horizontally and linearly in the radial direction.

In the method for constructing a triple shell tank, it is further desirable that the first construction opening, the second construction opening, and the third construction opening be opened so as to satisfy a relationship of $$H1 \geq H3 \geq H2$$

where H3 is an opening height of the third construction opening.

According to this construction method, even if a step exists in the height direction at the lowermost positions of the three side plates, it becomes easy to eliminate the step and form a construction opening that can secure a work traffic line extending horizontally and linearly in the radial direction on the three side plates.

In the method for constructing a triple shell tank, it is desirable that the outer tank side plate, the inner tank side plate, and the intermediate tank side plate be assembled by stacking a plurality of circular steps formed by arranging a plurality of side plate pieces in a circular ring shape, and the first construction opening, the second construction opening, and the third construction opening be opened by pulling out one or a plurality of the plurality of side plate pieces constituting the circular step.

According to this construction method, the first construction opening, the second construction opening, and the third construction opening can be opened by a simple method of removal of the side plate piece. Also in the sealing work of these construction openings, there is an advantage of only requiring a simple method of fitting the side plate pieces previously removed into the respective construction openings and fixing them by welding or the like.

In the method for constructing a triple shell tank, it is desirable that the side plate pieces have rectangular shapes of identical or approximate sizes, the first construction opening be opened by pulling out the side plate pieces for a plurality of adjacent N steps of circular steps constituting the outer tank side plate, and the second construction opening and the third construction opening be opened by pulling out the side plate pieces for (N−1) steps of circular steps constituting the inner tank side plate and the intermediate tank side plate, respectively.

According to this construction method, for the outer tank side plate, the first construction opening is opened by removing the side plate pieces for N steps. On the other hand, the second construction opening and the third construction opening opened in the inner tank side plate and the intermediate tank side plate are opened by removing side plate pieces of (N−1) steps smaller by one step than the steps of the outer tank side plate. Accordingly, the first construction opening having an opening area larger than that of the second construction opening and the third construction opening can be easily opened by the number of stages of the side plate pieces to be removed.

In the method for constructing a triple shell tank, it is desirable that the side plate pieces have rectangular shapes of identical or approximate sizes, the first construction opening be opened by pulling out the side plate pieces of a lowermost circular step and a second circular step of circular steps constituting the outer tank side plate, the second construction opening be opened by pulling out the side plate piece of a lowermost circular step of circular steps constituting the inner tank side plate, and the third construction opening be opened by pulling out the side plate piece of a second circular step on a lowermost circular step for height matching of circular steps constituting the intermediate tank side plate.

According to this construction method, the first construction opening is opened by pulling out side plate pieces for two stages from the lowermost step of the outer tank side plate. The second construction opening is opened by pulling out the lowermost side plate piece of the inner tank side plate, and the third construction opening is opened by pulling out the second side plate piece on the circular step for height matching. Accordingly, a construction opening corresponding to the step at the lowermost position of the three side plates can be opened in the respective side plates, and a work traffic line extending horizontally and linearly in the radial direction can be easily secured.

In the method for constructing a triple shell tank, it is desirable that an upper end of an anchor strap extending from a tank base be connected to the circular step for height matching of the intermediate tank side plate. Due to this, since the tank base and the lowermost circular step of the intermediate tank side plate are connected by the anchor strap, the strength of the intermediate tank side plate can be improved.

The invention claimed is:

1. A method for constructing a triple shell tank including an inner tank, an intermediate tank, and an outer tank each having a roof and a side plate, the method comprising processes of:
   as construction entrances, opening a first construction opening in the outer tank side plate when installing the outer tank side plate, a second construction opening in the inner tank side plate when installing the inner tank side plate, and a third construction opening in the intermediate tank side plate when installing the intermediate tank side plate; and
   sealing the second construction opening after completion of work inside the inner tank, then sealing the third construction opening after completion of work inside the intermediate tank, and subsequently, sealing the first construction opening after completion of work inside the outer tank,
   wherein the first construction opening, the second construction opening, and the third construction opening are opened so as to at least partially overlap with one another in a circumferential direction and a height direction of the triple shell tank, and
   the first construction opening and the second construction opening are opened so as to satisfy a relationship of $$AR1 \geq AR2$$

where AR1 is an opening area of the first construction opening and AR2 is an opening area of the second construction opening.

2. The method for constructing a triple shell tank according to claim 1, wherein
   the first construction opening, the second construction opening, and the third construction opening are opened so as to satisfy a relationship of $$AR1 \geq AR3 \geq AR2$$

where AR3 is an opening area of the third construction opening.

3. The method for constructing a triple shell tank according to claim 1, wherein
   the first construction opening and the second construction opening are opened so as to satisfy a relationship of $$H1 \geq H2$$

where H1 and H2 are an opening height of the first construction opening and an opening height of the second construction opening, respectively.

4. The method for constructing a triple shell tank according to claim 3, wherein
   the first construction opening, the second construction opening, and the third construction opening are opened so as to satisfy a relationship of $$H1 \geq H3 \geq H2$$

where H3 is an opening height of the third construction opening.

5. The method for constructing a triple shell tank according to claim 1, wherein
   the outer tank side plate, the inner tank side plate, and the intermediate tank side plate are assembled by stacking a plurality of circular steps formed by arranging a plurality of side plate pieces in a circular ring shape, and
   the first construction opening, the second construction opening, and the third construction opening are opened by pulling out one or a plurality of the plurality of side plate pieces constituting the circular step.

6. The method for constructing a triple shell tank according to claim 5, wherein
   the side plate pieces have rectangular shapes of identical or approximate sizes,
   the first construction opening is opened by pulling out the side plate pieces for a plurality of adjacent N steps of circular steps constituting the outer tank side plate, and
   the second construction opening and the third construction opening are opened by pulling out the side plate pieces for (N−1) steps of circular steps constituting the inner tank side plate and the intermediate tank side plate, respectively.

7. The method for constructing a triple shell tank according to claim 5, wherein
   the side plate pieces have rectangular shapes of identical or approximate sizes,
   the first construction opening is opened by pulling out side plate pieces of a lowermost circular step and a second circular step of the circular steps constituting the outer tank side plate,
   the second construction opening is opened by pulling out a side plate piece of a lowermost circular step of the circular steps constituting the inner tank side plate, and
   the third construction opening is opened by pulling out a side plate piece of a second circular step on a lowermost circular step for height matching of the circular steps constituting the intermediate tank side plate.

8. The method for constructing a triple shell tank according to claim 7, wherein an upper end of an anchor strap extending from a tank base is connected to a circular step constituting the intermediate tank side plate for height matching of the intermediate tank side plate.

* * * * *